United States Patent [19]

Mameda et al.

[11] Patent Number: 5,287,443
[45] Date of Patent: Feb. 15, 1994

[54] APPARATUS FOR EDITING DOCUMENTS ADAPTED TO REDUCE A PROCESS TIME OF REFRESHING THE DOCUMENTS

[75] Inventors: Kenji Mameda, Kashihara; Shigeru Yoshida, Kita-Katsuragi; Shuichiro Ono, Soraku; Noboru Kubo, Yamato-Koriyama, all of Japan

[73] Assignee: Sharp Kabushiki Kaisha, Osaka, Japan

[21] Appl. No.: 705,038

[22] Filed: May 21, 1991

[30] Foreign Application Priority Data

May 24, 1990 [JP] Japan ................................. 2-135122

[51] Int. Cl.⁵ .......................................... G06F 15/62
[52] U.S. Cl. ...................................... 395/146; 395/144
[58] Field of Search ............... 395/144, 145, 146, 148, 395/131, 135; 340/799; 364/419

[56] References Cited

U.S. PATENT DOCUMENTS

| | | | |
|---|---|---|---|
| 4,538,183 | 8/1985 | Kanno et al. | 358/280 |
| 5,122,953 | 6/1992 | Uekusa et al. | 364/419 |
| 5,150,458 | 9/1992 | Masuzaki et al. | 395/135 |

OTHER PUBLICATIONS

*Microsoft Windows Write User's Guide*, 1987, pp. 20-25.
A High Speed Display Method on Editing Documents, Kenji Mameda, Shuichiro Ono, Shigeru Yoshida, Noboru Kubo, Proceedings of 41st National Meeting (The second half of 1990), pp. 3-245, —3-246, Information Processing Society of Japan (IPS).

*Primary Examiner*—Gary V. Harkcom
*Assistant Examiner*—Joseph H. Feild
*Attorney, Agent, or Firm*—David G. Conlin; Robert F. O'Connell; Peter F. Corless

[57] ABSTRACT

An apparatus for editing documents input from an input device, capable of reducing a process time of renewing the documents to be displayed on a display device and capable of increasing a displaying speed of the renewed documents during an editing process includes a document storing unit for storing document data, a text-layout information storing unit for storing text-layout information separately in accordance with a preceding time and a succeeding time with respect to an editing operation, the text-layout information indicating positions of the document data on the display device at a time when the document data are displaying, a display image storing unit for storing image data, the image data being used for displaying the document data stored in the document storing unit on the display device in accordance with the text-layout information in the preceding time stored in the text-layout information storing unit, an editing unit for producing the text-layout information in the succeeding time from the text-layout information in the preceding time stored in the text-layout information storing unit and the document data stored in the storing unit in accordance with an indication input from the input device, and a processing unit for renewing the image data stored in the display image storing unit in accordance with a process of redisplaying characters and a process of transmitting the image data.

19 Claims, 52 Drawing Sheets

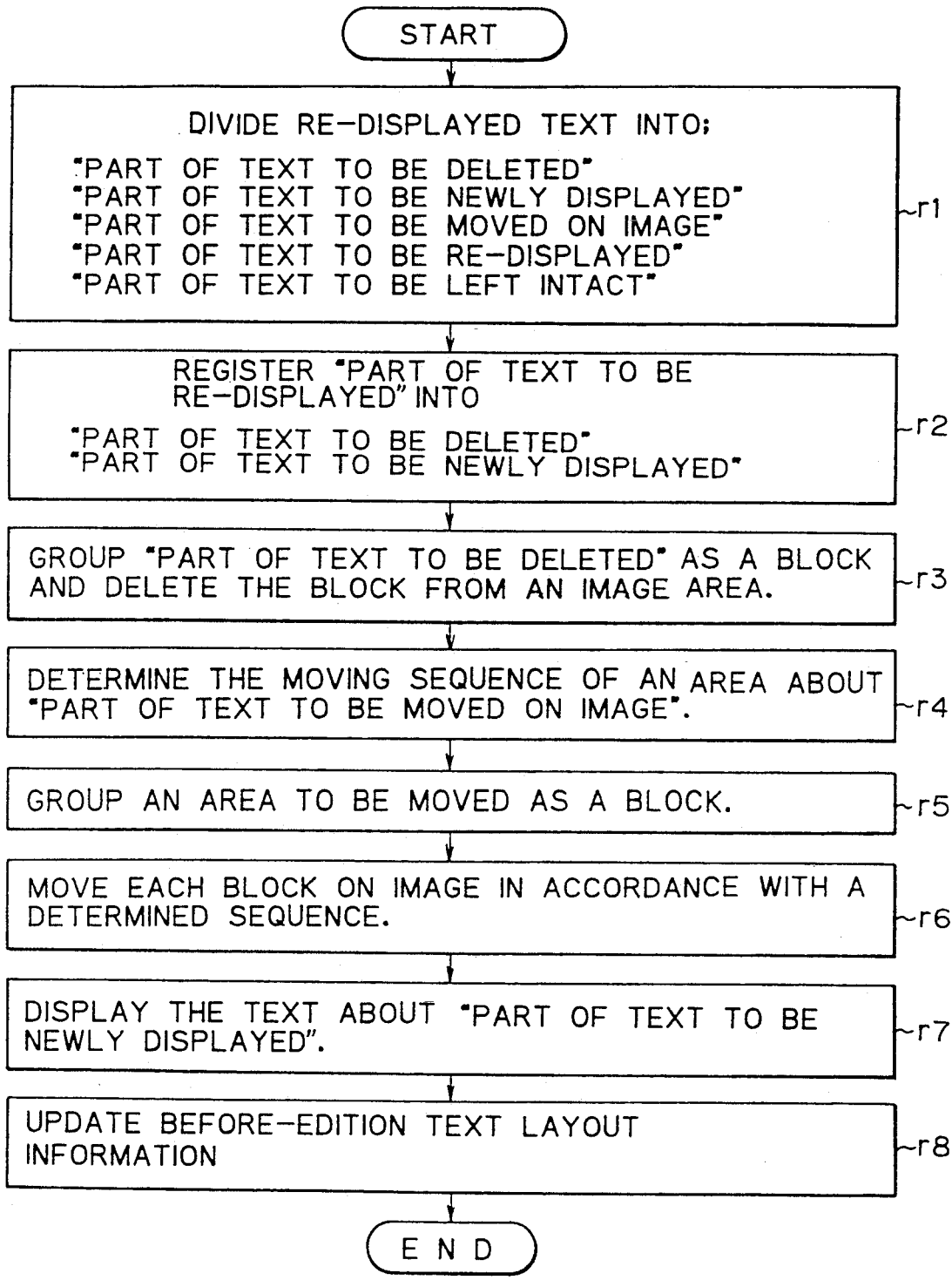

Fig. 5a

LINE 1:

| LINE LOCATION (x,y) | LINE HEIGHT | LINE LENGTH | PROCESSING FLAG | CHARACTER STRING INFORMATION |
|---|---|---|---|---|
| 41 | 42 | 43 | 44 | 45 |

LINE 2:

| LINE LOCATION (x,y) | LINE HEIGHT | LINE LENGTH | PROCESSING FLAG | CHARACTER STRING INFORMATION |
|---|---|---|---|---|

Fig. 5b

LINE 1:

| LINE LOCATION (x,y) | LINE HEIGHT | LINE LENGTH | PROCESSING FLAG | CHARACTER STRING INFORMATION |
|---|---|---|---|---|
| 51 | 52 | 53 | 54 | 55 |

LINE 2:

| LINE LOCATION (x,y) | LINE HEIGHT | LINE LENGTH | PROCESSING FLAG | CHARACTER STRING INFORMATION |
|---|---|---|---|---|

MOVING DIRECTION: MOVEMENT DIRECTED FROM TEXT HEAD TO TAIL
    MOVEMENT DIRECTED FROM TEXT TAIL TO HEAD
    MIXTURE OF BOTH MOVEMENTS/NO MOVEMENT ON IMAGE

Fig. 6a

THE CHANGE OF ATTRIBUTES OF A
CHARACTER STRING RESULTS IN
CHANGING [A TYPESTYLE, A DECORATION,]
AND SO FORTH.

Fig. 6b

THE CHANGE OF ATTRIBUTES OF A
CHARACTER STRING RESULTS IN
CHANGING <u>A TYPESTYLE, A DECORATION,</u>
AND SO FORTH.

Fig. 7a

THIS IS AN EXAMPLE THAT THE
CHARACTER STRING TO BE EDITED
IS [,] RETURNED TO THE PREVIOUS LINE.

THIS IS AN EXAMPLE THAT THE
CHARACTER STRING TO BE EDITED
IS RETURNED TO THE PREVIOUS LINE.

THE RUN-IN OR EXPEL PROCESSING MAY OFTEN RESULTS IN CHANGING LINE SPACING (SPACING BETWEEN CHARACTERS)―141 IN RESPECTIVE LINES.

THE RUN-IN OR EXPEL PROCESSING MAY OFTEN RESULTS IN CHANGING LINE IN RESPECTIVE LINES.

追込み／追出し処理により、字間が異なることがある。

Fig. 11
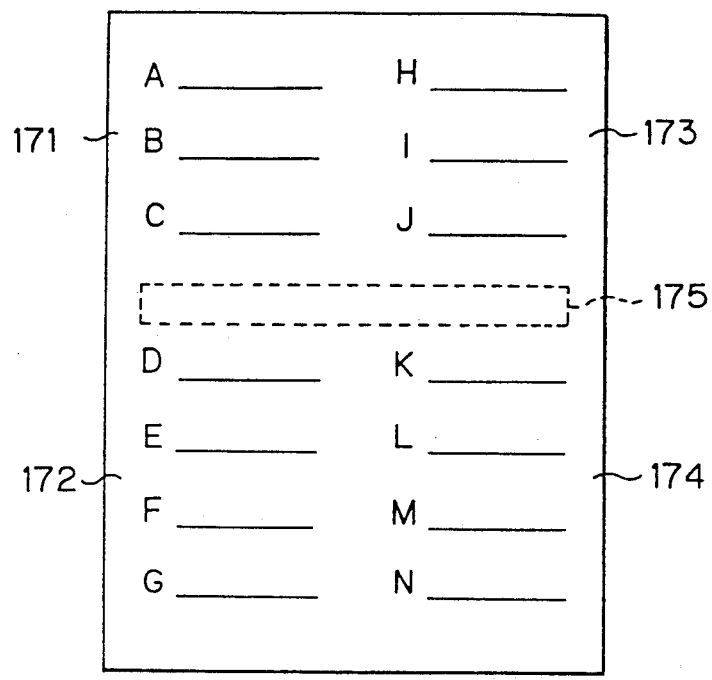
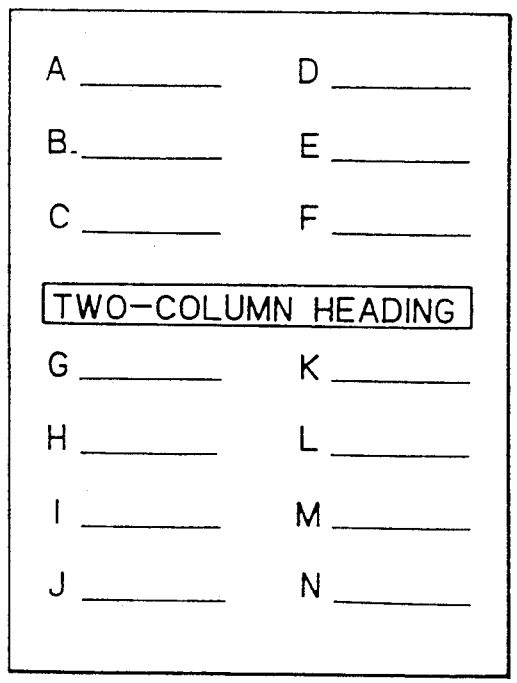

○ : BEFORE EDITION

☐ : AFTER EDITION

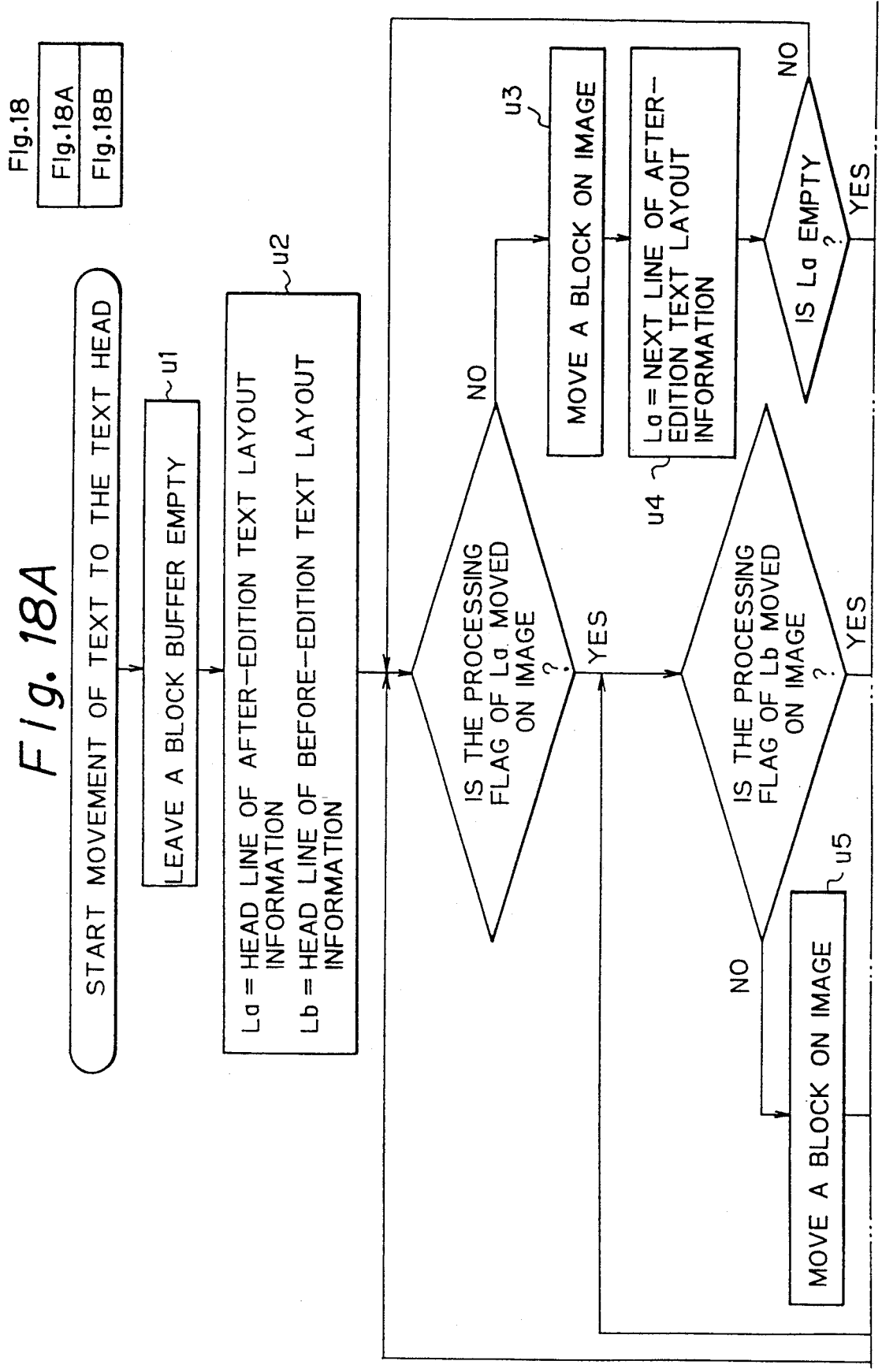

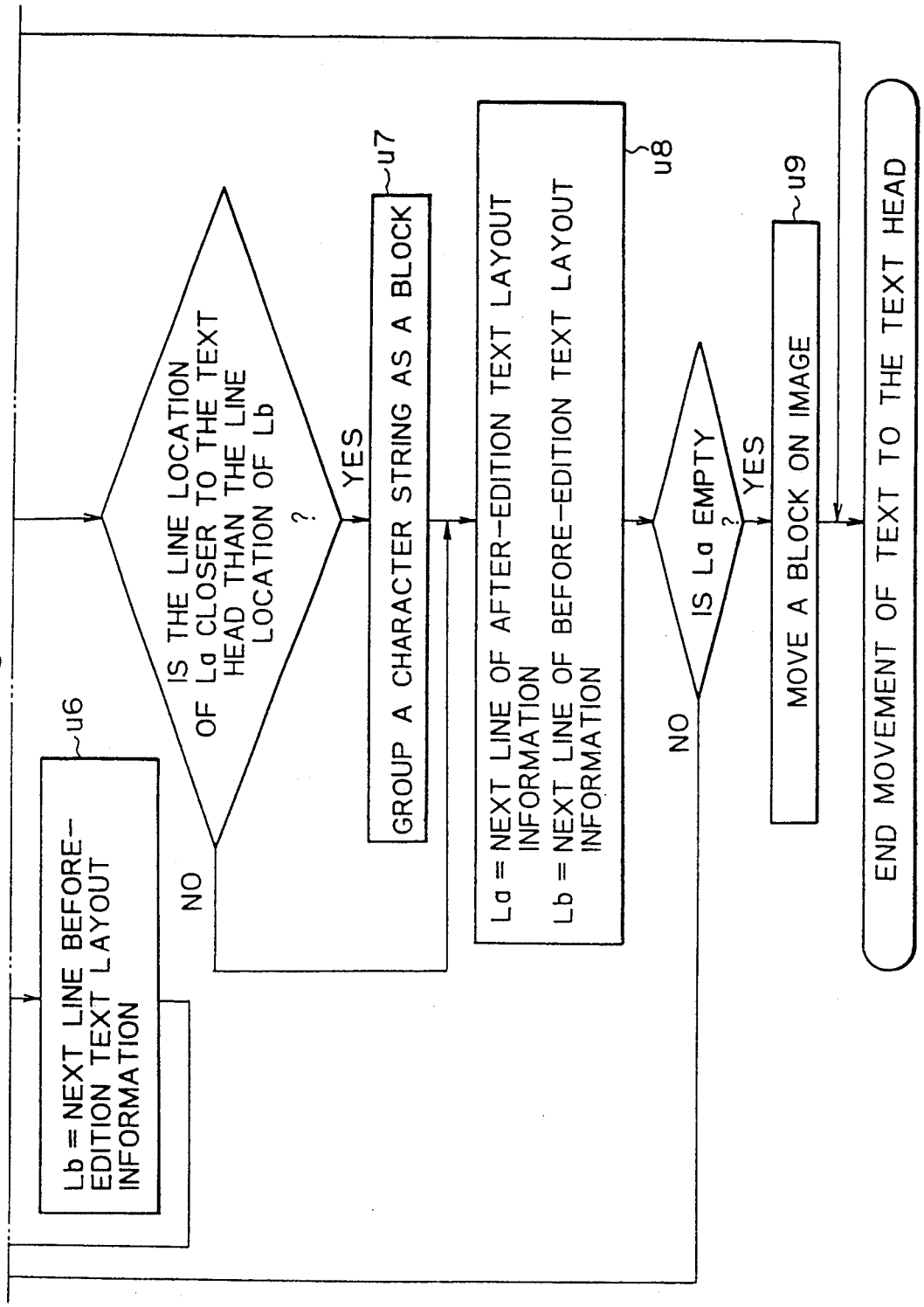

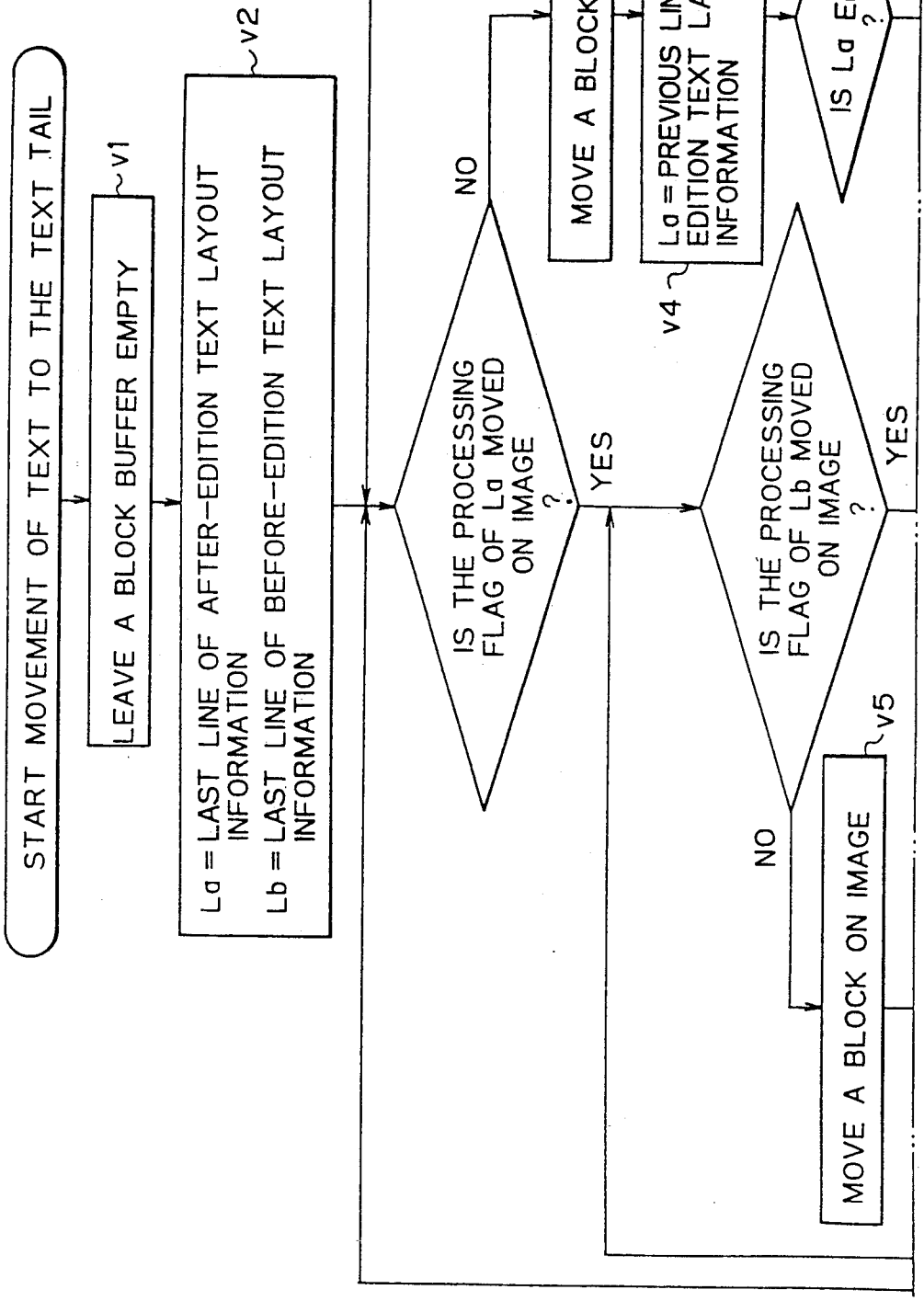

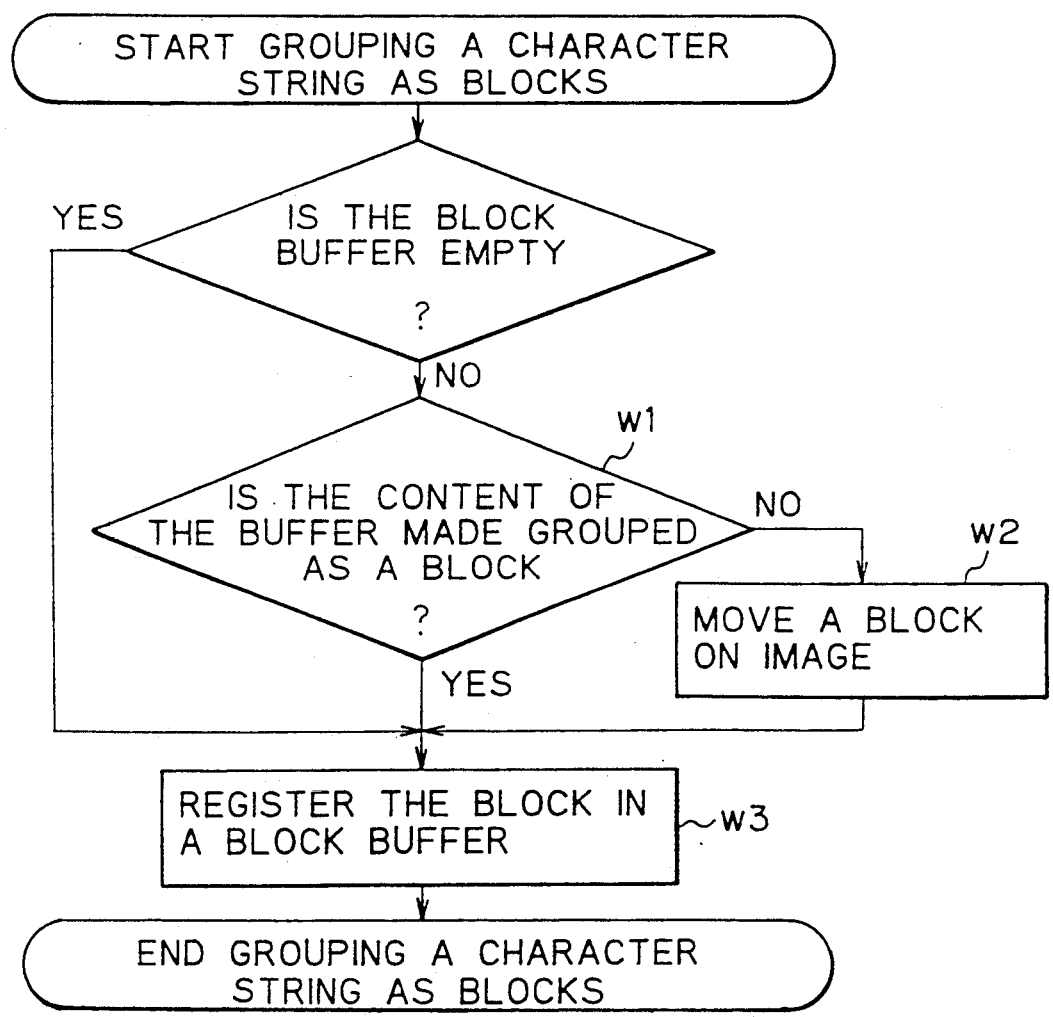

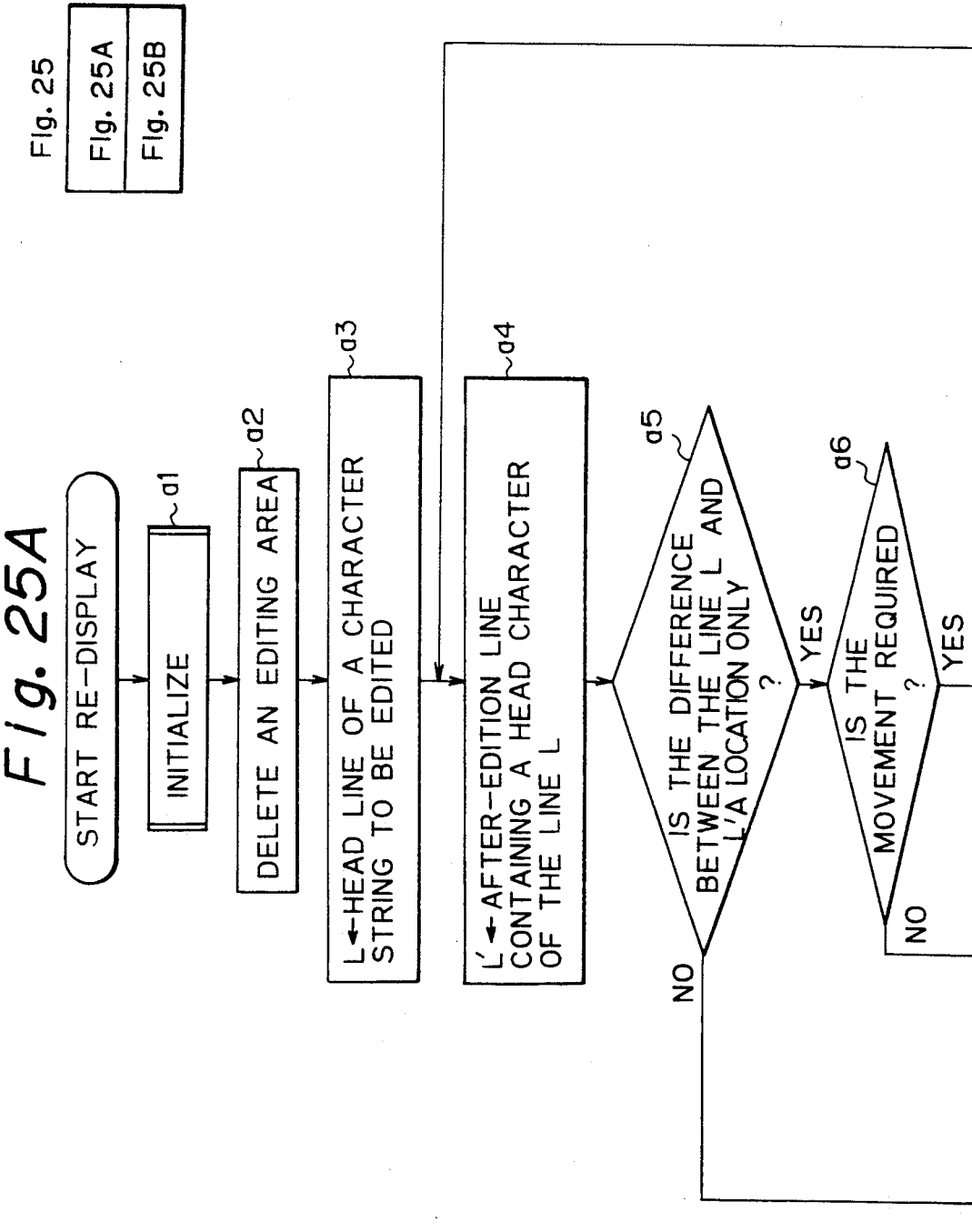

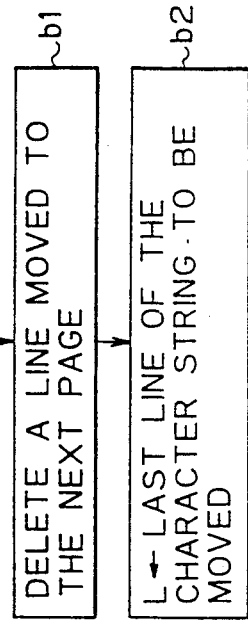

Fig. 31A

| Fig. 31 |
|---|
| Fig. 31A |
| Fig. 31B |

```
         ┌─────────────────────────┐
         │ DISPLAY THE TEXT ON A   │
         │ CHARACTER BASIS (FIRST HALF) │
         └───────────┬─────────────┘
                     │ h1
         ┌───────────▼─────────────┐
         │ C ← HEAD CHARACTER OF THE LINE L │
         └───────────┬─────────────┘
                     │
                  ◇ h2
          IS C CONTAINED IN THE LINE L ?
              NO ──→          YES ↓
                          ◇ h3
                    IS C A UNTRANSFERABLE CHARACTER ?
                       YES ──→         NO ↓
                                    ◇ h4
                              IS C REQUIRED TO MOVE ?
                                 NO ──→        YES ↓
                                             ◇ h5
                                       IS THE MOVING DESTINATION EMPTY ?
                                          NO ──→ [h8 FLASH CHARACTER TRANSFER AND CHARACTER DELETION BUFFERS]
                                          YES ↓ h11 [FLASH THE CHARACTER TRANSFER BUFFER]
              ↓
         h12 [DELETE THE CHARACTER]
```

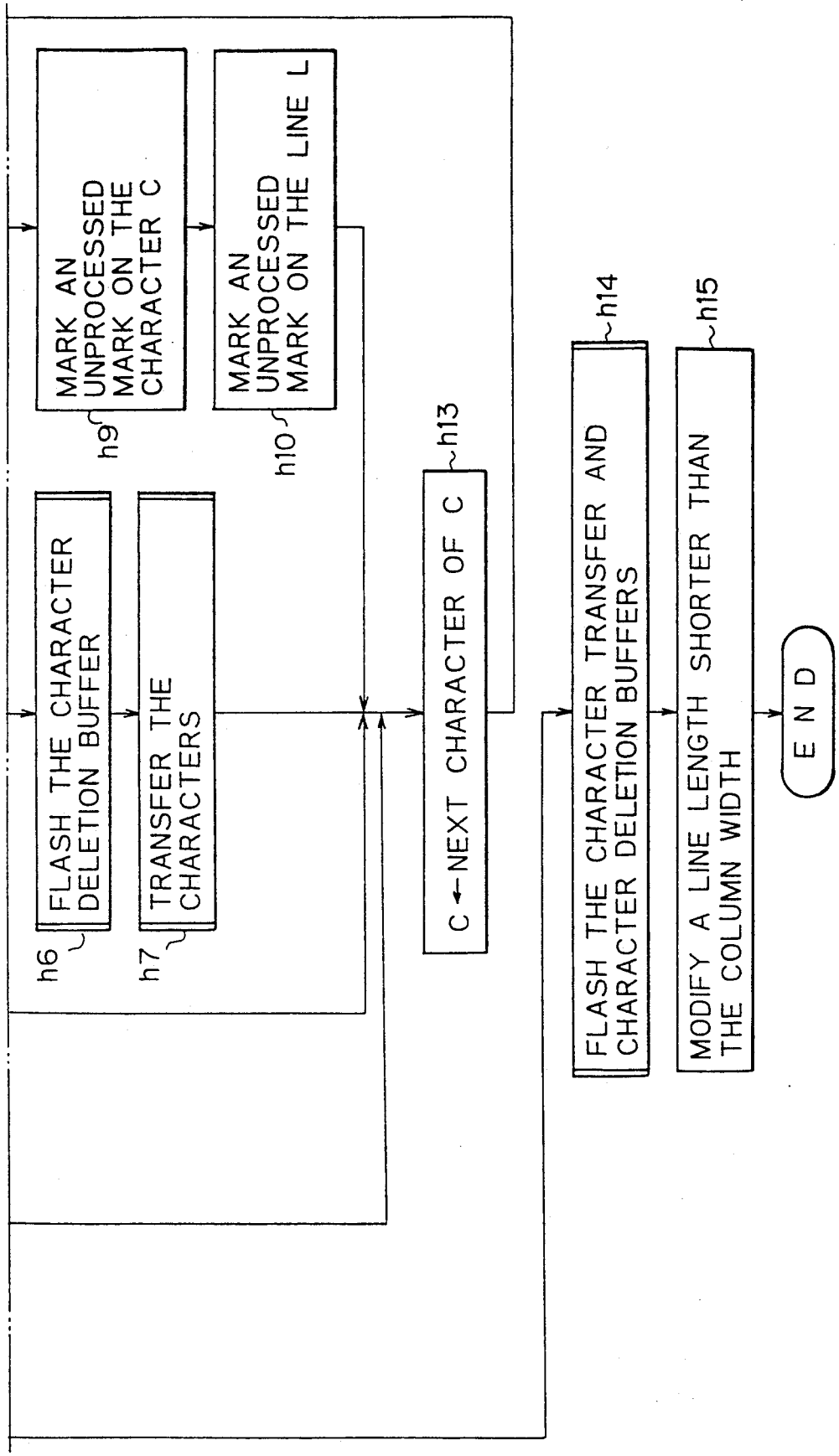

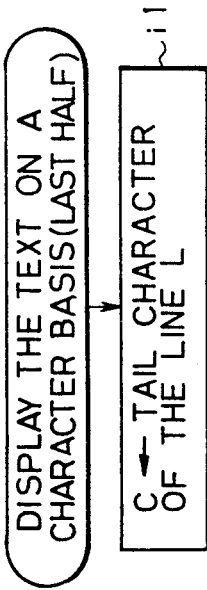

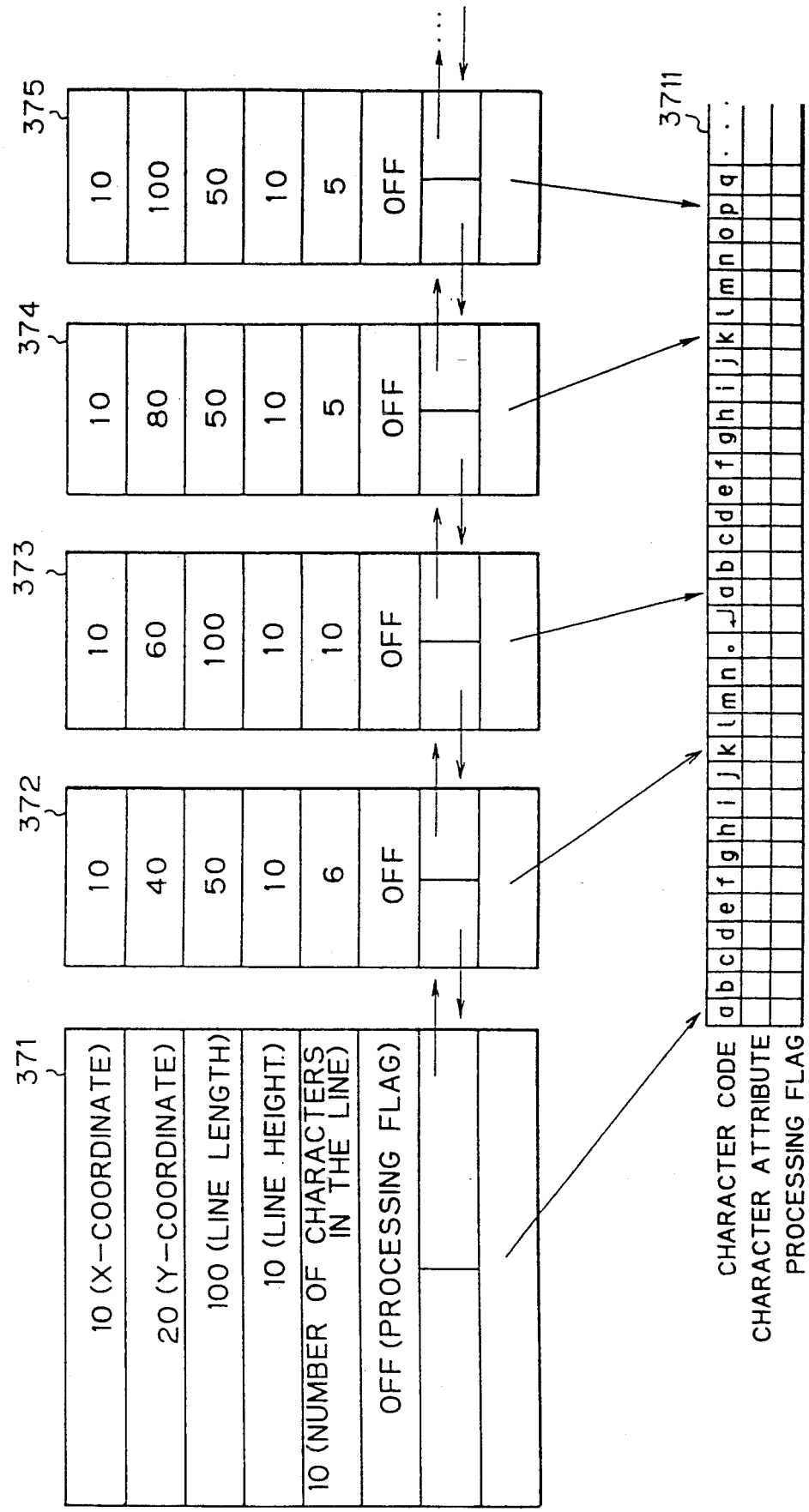

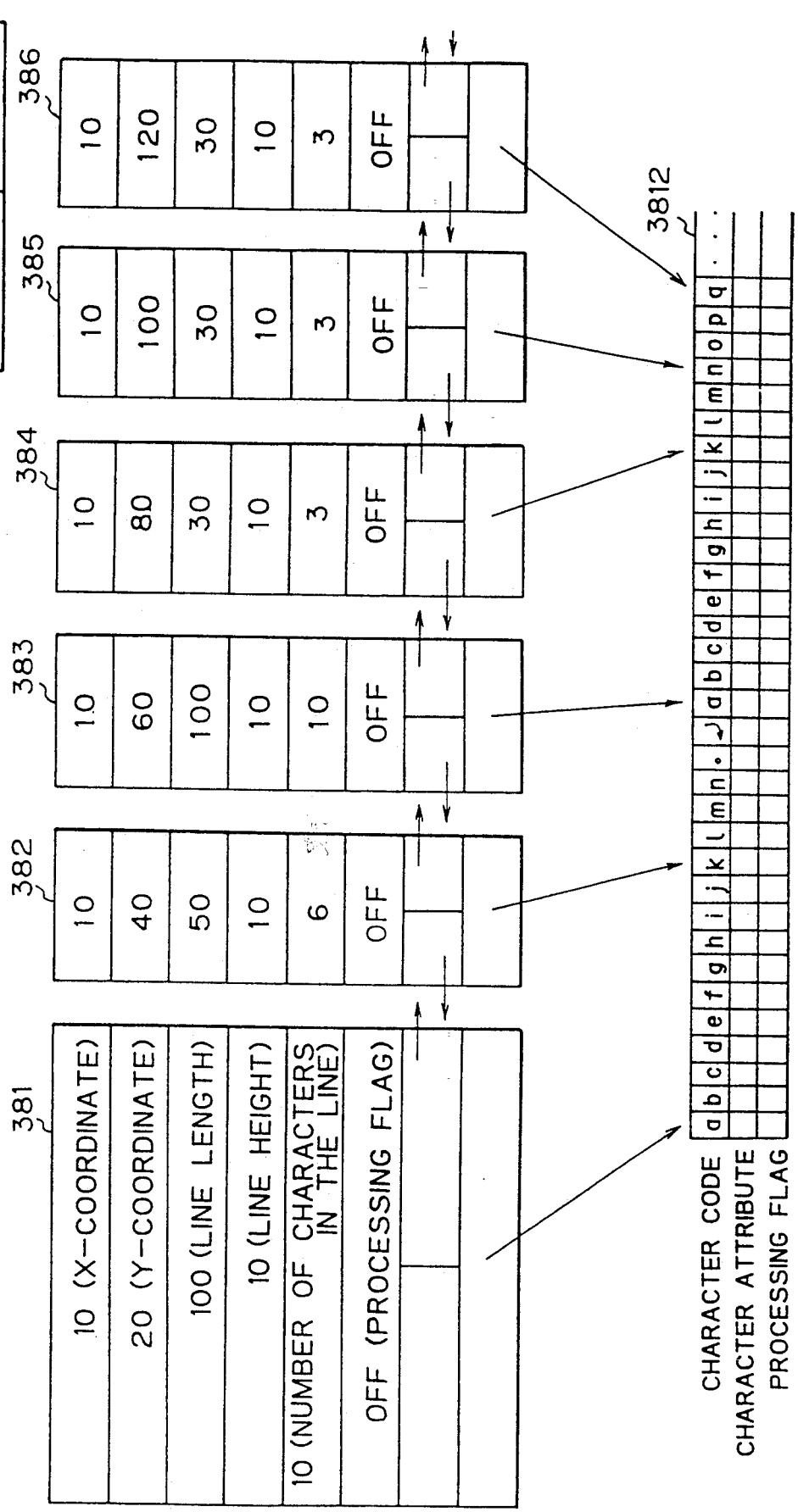

Fig. 45
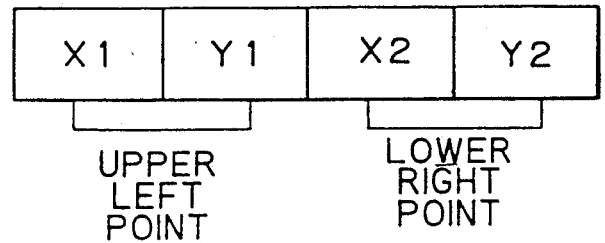
Fig. 46
| 150 | 70 | 160 | 80 |
|-----|----|----|-----|
| 130 | 90 | 140 | 100 |
Fig. 47
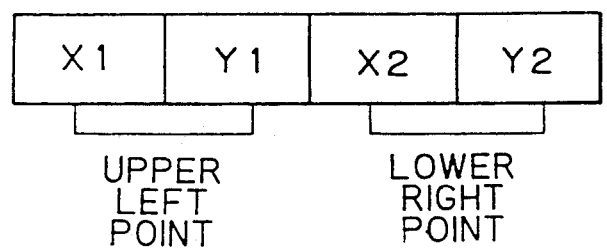

Fig. 50

| 120 | 30 | 220 | 40 |
|---|---|---|---|
| 120 | 50 | 220 | 60 |

Fig. 51

| 120 | 10 | 220 | 20 |
|---|---|---|---|
| 120 | 50 | 220 | 60 |

Fig. 52

| | X1 | Y1 | X2 | Y2 |
|---|---|---|---|---|
| BEFORE EDITION | X1 | Y1 | X2 | Y2 |
| AFTER EDITION | X1 | Y1 | X2 | Y2 |

UPPER LEFT POINT     LOWER RIGHT POINT

APPARATUS FOR EDITING DOCUMENTS ADAPTED TO REDUCE A PROCESS TIME OF REFRESHING THE DOCUMENTS

BACKGROUND OF THE INVENTION

1. Field of the Invention

The present invention relates to an apparatus for editing documents such as a computer typesetting system (CTS), a desk-top publishing system (DTP), a documentation workstation, or a word processor.

2. Description of the Related Art

The inventor of the present invention knows that there are document editing apparatus capable of editing documents i.e., inserting or deleting a character string and/or a frame for enclosing a character string as well as changing sizes of characters or frames.

However, the above-mentioned document editing apparatus has to rebuild a composition of other characters rather than the target characters with the insertion, the edition or the change of the sizes of the target characters.

In a case that one character is inserted, the above-mentioned document editing apparatus rebuilds the locations of the inserted characters as well as the character string after the inserted characters in the line (change the displayed locations of the characters). For instance, one or more characters are overflown out of the line, the above-mentioned document editing apparatus performs a change of the displayed locations of all the characters after the inserted character in the paragraph. As a result of the change, the lines are increased and the apparatus performs a change of the displayed locations of all the characters after the inserted character in the paragraph.

The above-mentioned document editing apparatus performs of temporarily painting the characters in white on the display area to be changed for deleting those characters and to display font raster images read out of an IC memory or an external storage device at the new locations on the display determined by the edition.

The above-mentioned document editing apparatus is designed to change the displayed locations of all the changed characters resulting from the edition. Hence, the apparatus has a disadvantage that it requires a long time (response time) between a time period when an operator gives an edition indication and when the edited result is terminated. In particular, the apparatus for a high-level editing which is capable of handling many kinds of fonts and many character sizes cannot actually have all the font raster images including less frequently-used fonts in an internal storage device such as an IC memory for the purpose of making economical use of the hardware. This type of apparatus, therefore, often has the font raster images which are stored in an external storage device or changed as vector fonts like outline fonts. In order for this type of apparatus to display the characters, it is necessary to read the font raster images from the external storage device and to expand or reduce the font raster images or to develop the vector fonts for obtaining the raster images. It results that the high-level document editing apparatus requires a larger load and a longer response time on the display system in order to change the displayed locations of the characters.

Moreover, another type of the above-mentioned document editing apparatus which is capable of supporting a multi-window function is arranged to save the displayed part hidden under another window as raster images in the storage device and to display the stored raster images at a time when it restores the original image for the purpose of reducing a response time. The above-mentioned apparatus, however, can not improve a disadvantageous longer response time, because it serves to read the font raster images from the IC memory or the external storage device and to display the font raster images at the new display locations resulting from the edition.

SUMMARY OF THE INVENTION

It is therefore an object of the present invention to provide an apparatus for editing documents which is capable of reducing a process time of obtaining new font raster images to be displayed and also capable of increasing a displaying speed at a time when it edits the characters by reducing the number of characters to be changed in the edition.

The object of the present invention can be achieved by an apparatus for editing documents input from an input device, the apparatus capable of reducing a process time of renewing the documents to be displayed on a display device and capable of increasing a displaying speed of the renewed documents during an editing process, the apparatus includes a document storing unit for storing document data, a text-layout information storing unit for storing text-layout information separately in accordance with a preceding time and a succeeding time with respect to an editing operation, the text-layout information indicating positions of the document data on the display device at a time when the document data are displaying, a display image storing unit for storing image data, the image data being used for displaying the document data stored in the document storing unit on then display device in accordance with the text-layout information in the preceding time stored in the text-layout information storing unit, an editing unit for producing the text-layout information in the succeeding time from the text-layout information in the preceding time stored in the text-layout information storing unit and the document data stored in the document storing unit in accordance with an indication input from the input device, and a processing unit for renewing the image data stored in the display image storing unit in accordance with a process of redisplaying characters and a process of transmitting the image data.

Preferably, the editing unit is further capable of storing the text-layout information in the succeeding time and renewing the document data stored in the document storing unit.

More preferably, the processing unit is further capable of comparing the text-layout information in the preceding time with the text-layout information in the succeeding time stored in the text-layout information storing unit.

The text-layout information storing unit preferably includes a pointer for separating the text-layout information in the preceding time and the text-layout information in the succeeding time.

The editing unit is further capable of renewing the text-layout information in the succeeding time as the text-layout information in preceding time after completing a renewal process of the image data stored in the image storing unit, preferably.

Further preferably, the text-layout information storing unit includes a storing device for storing the text-layout information in the preceding time and another storing device for storing the text-layout information in the succeeding time.

The renewing unit is further capable of dividing the text-layout information to be redisplayed into a plurality of parts.

The plurality of parts preferably include a part to be deleted, a part to be newly displayed, a part to be moved on image, a part to be redisplayed, and a part to be left intact.

Preferably, the renewing unit is further capable of registering the text-layout information in the part to be redisplayed into the part to be deleted and the part to be newly displayed, respectively.

The renewing unit is further capable of grouping the text-layout information in the part to be deleted as blocks and deleting the text-layout information in the part to be deleted from an area of the image data, preferably.

The renewing unit is further capable of determining a moving sequence of an area in the part to be moved on image, preferably.

The renewing unit is further capable of grouping the moving area as blocks, preferably.

The renewing unit is further capable of moving each of the blocks in accordance with a determining sequence, preferably.

The renewing unit is further capable of displaying the text-layout information in the part to be newly displayed, preferably.

Further preferably, the text-layout information includes a line location, a line height, line length, a processing flag for indicating a line or a character to be displayed and/or to be moved.

The text-layout information further includes a character string information having a character code, a type style, and a size of the type style, preferably.

More preferably, the apparatus further comprises a using area managing unit for registering the text-layout information to be redisplayed from the text-layout information in the preceding time.

The apparatus further comprises a line transfer buffer for temporarily storing lines to be transferred, preferably.

The apparatus further comprises a line deletion buffer for temporarily storing lines to be deleted, preferably.

Preferably, the apparatus further comprises a character transfer buffer for temporarily storing characters to be transferred.

More preferably, the apparatus further comprises a character deletion buffer for temporarily storing characters to be deleted.

The apparatus further comprises a display image managing device for managing a display image, preferably.

The apparatus further comprises a display control device for controlling the displaying device so that the display image managed in accordance with the display image managing device are promptly displayed on the display device.

In operation, the apparatus for editing documents of the present invention serves to divide text layout information about the layout on the display of the document data stored in the document data storing unit into the parts of information about before the edition and about after the edition and store the parts of information as the text-layout information in the preceding time (hereinafter, it is called as a before-edition text layout information) and the text-layout information in the succeeding time (hereinafter, it is called as an after-edition text layout information) in the text layout information storing unit. The image data to be displayed on the screen is composed on the basis of the before-edition text layout information stored in the text layout information storing unit and is stored in the display image storing unit. Then, in accordance with an indication input by an operator through the input device, the editing unit serves to create the after-edition text layout information from the before-edition text layout information stored in the text layout information storing unit and the document data stored in the document storing unit. The editing unit then stores the created after-edition text layout information in the text layout information storing unit and update the document data stored in the document data storing unit. Then, the processing unit serves to compare the before-edition text layout information stored in the text layout information storing unit with the after-edition text layout information and update the content stored in the display image storing unit through the character redisplay processing and the image transfer processing on the basis of the compared result.

Further objects and advantages of the present invention will be apparent from the following description of the preferred embodiments of the invention as illustrated in the accompanying drawings.

BRIEF DESCRIPTION OF THE DRAWINGS

FIG. 3 is a flowchart for illustrating flow of redisplaying processing executed by the apparatus shown in FIG. 1;

FIGS. 5A to 5E are views showing structure of each data by using the apparatus shown in FIG. 1;

FIGS. 6A and 6B are views for explaining examples of a page to be edited and an edited page by using the apparatus shown in FIG. 1;

FIGS. 7A and 7B are views for explaining examples of a page to be edited and an edited page by using the apparatus shown in FIG. 1;

FIGS. 8A and 8B are views for explaining examples of a page to be edited and an edited page by using the apparatus shown in FIG. 1;

FIG. 11 is a view for explaining an example of a page being edited by using the apparatus shown in FIG. 1;

FIGS. 16 to 21 are flowcharts for illustrating the flow of display processing of the apparatus shown in FIG. 1 in details;

FIGS. 24 to 36 are flowcharts for illustrating flow of processing executed in another embodiment of the present invention; and FIGS. 37 to 52 are views for explaining respectively a structure of each data of the another embodiment of the present invention.

DESCRIPTION OF THE PREFERRED EMBODIMENTS

The apparatus for editing document of the present invention will be described with reference to the accompanying drawings.

Figure 1:
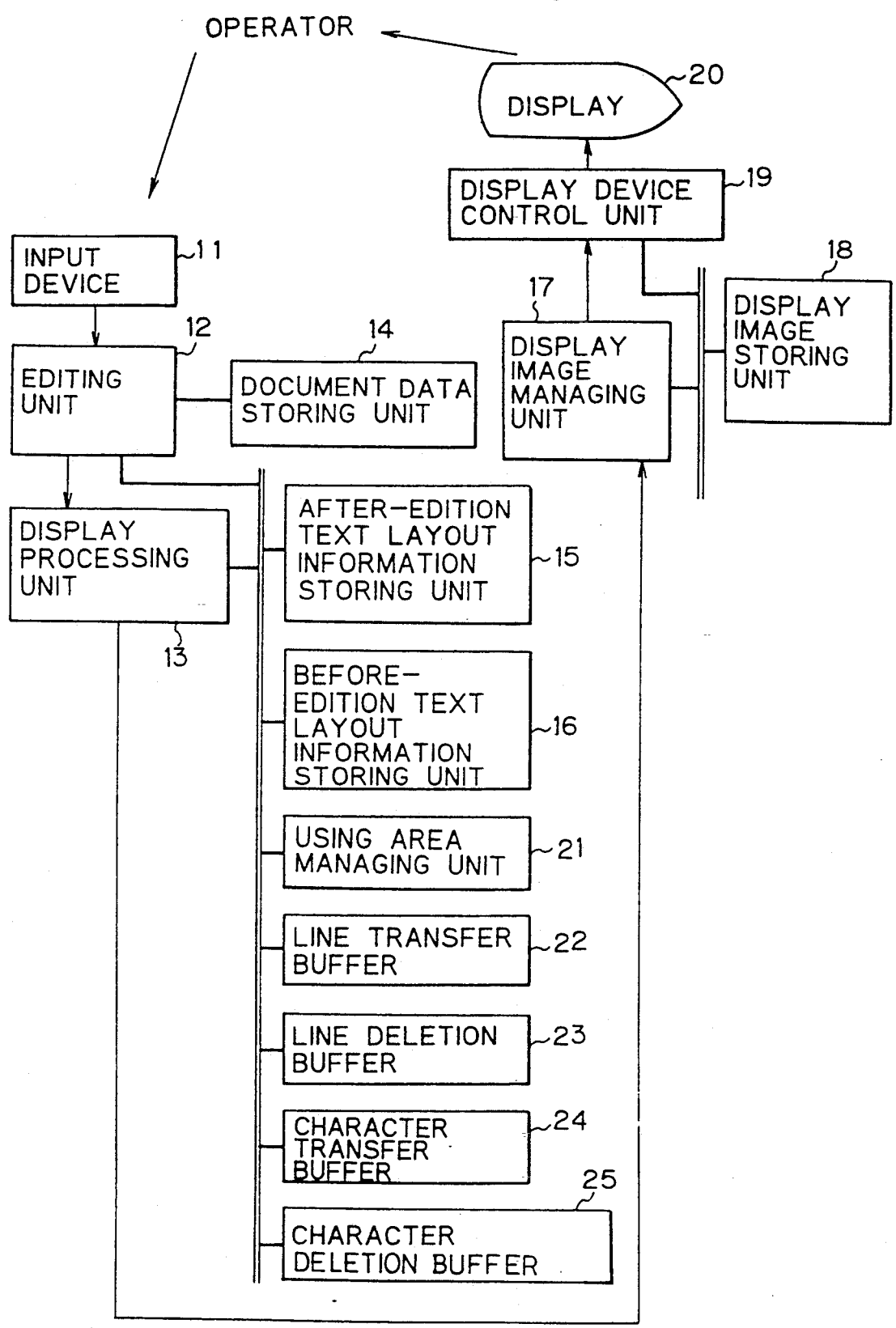
FIG. 1 is a block diagram showing an apparatus for editing documents according to an embodiment of the present invention.

FIG. 1 is a block diagram showing the apparatus for editing documents (hereinafter, it is called as a document editing machine) according to an embodiment of the present invention.

When an operator gives an indication about an insertion or a deletion of a character string, a change of an attribute, an addition, a deletion or a movement of a frame to the document editing machine itself through an input device 11. In response to the indication, an editing unit 12 serves to derive a layout location of each text on the display 20. A display processing unit 13 serves to redisplay the text in accordance with the indicated edition.

The image appearing on the display 20 is stored in a display image storing unit 18. This display image storing unit 18 saves a raster image of an overall page being edited or a raster image of an area (window) opened for edition on the display device. The display image storing unit 18 is thus referred to as a window buffer. It is managed under the control of a display image managing unit 17.

A display device control unit 19, which serves to display the content of the display image storing unit 18 on the display 20 as considering the screen, the size and overlap of a window, and so forth. The layout information of each text appearing on the display 20 before the edition is stored in a before-edition text layout information storing unit 16 and the layout information of each text appearing on the display 20 after the edition is stored in an after-edition text layout information storing unit 15.

It is possible to grasp the location of the raster image of each character string appearing on the display 20 in light of the information stored in the before-edition text layout information storing unit 16. Further, it is possible to grasp the attributes such as a location and a character size about the text to be redisplay or newly displayed in light of the information stored in the after-edition text layout information storing unit 15.

The editing unit 12 serves to create the after-edition text layout information stored in the layout information storing unit 15 and change the document data stored in the document data storing unit 14 on the basis of the content stored in the before-edition text layout information storing unit 16 and the content stored in the document data storing unit 14.

A using area managing unit 21 serves to register an area of a line to be redisplay in light of the content stored in the before-edition text layout information storing unit 16. As the document editing machine itself keeps the text being redisplayed, the using area managing unit 21 serves to delete the information about an original line before transferred or deleted each time when a character string is transferred or deleted, enabling to rationally advance the image-transfer processing.

Moreover, in a case that two or more lines or characters are transferred or deleted once, the document editing machine increases a redisplay routine speed, because it is possible to reduce the number of drawing as compared with the case that one line or character is transferred or deleted, thereby lessening the load applied on the drawing routine. For the purpose, the present document editing machine provides a line transfer buffer 22, a line deletion buffer 23, a character transfer buffer 24, and a character deletion buffer 25.

Figure 2:
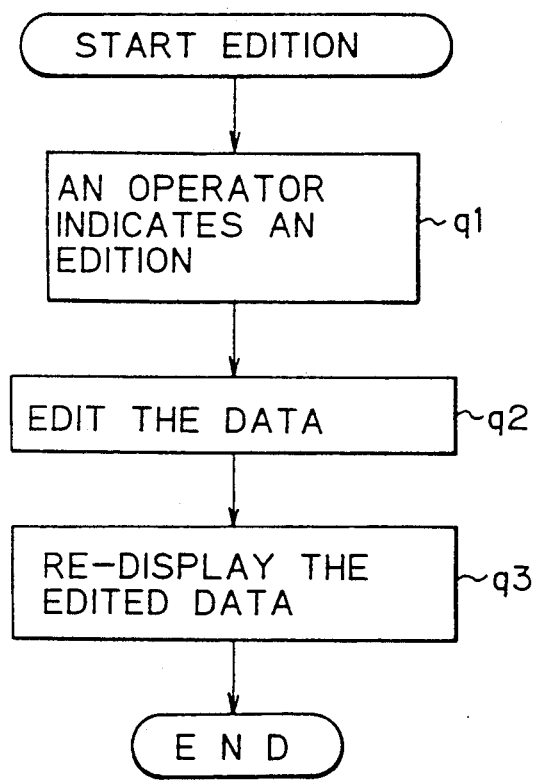
FIG. 2 is a flowchart for illustrating flow of edition executed by the apparatus shown in FIG. 1.

FIG. 2 is a flowchart illustrating a flow of an edition performed in the first embodiment. At a step q1, an operator gives an indication about a kind of edition to the machine. At a step q2, the document editing machine performs the edition and provides the resulting text layout. At that time, the resulting layout about the recomposed text is stored in the after-edition text layout information storing unit 15 shown in FIG. 1.

The edited text layout information (edited result) is stored in the after-edition text layout information storing unit 15 and the original (before-edition) text layout information is stored in the before-edition text layout information storing unit 16. At a step q3, the display processing unit 13 serves to perform the redisplaying processing on the basis of the content stored in the after-edition text layout information storing unit and the content stored in the before-edition text layout information storing unit 16.

FIG. 3 is a flowchart schematically illustrating the redisplaying processing. At a step r1, the redisplaying text is divided into "part of text to be deleted", "part of text to be newly displayed", "part of text to be moved", "part of text to be relocated", and "part of text to be left intact". The phrase "part of text to be deleted" unit the text deleted as result of the indicated edition or the text overflown from the screen/page as a result of inserting the character string or the frame, for example. This part of text is required to be derived from the before-edition text layout information and be deleted from the image information contained in the display image storing unit 18.

The phrase "part of text to be newly displayed" unit the text inserted as a result of inserting the character string or newly entered into the screen/page as a result of deleting the character string or the frame. The location of this text is required to be derived on the basis of the after-edition text layout information and to be displayed. The character string whose attributes such as type styles and character sizes to be changed are contained in "part of text to be deleted" and "part of text to be newly displayed".

The edition-unintended text or the text to be edited but whose attributes is left intact on the condition that the text is left on the screen/page is divided into the text whose location is changed and the text whose location is left intact.

The text whose location is left intact corresponds to "part of text to be left intact". This part of text does not require any processing. The text whose location is changed is divided into "part of text to be moved" and "part of text to be relocated" in the display image storing unit 18. The "part of text to be relocated" is registered in both of "part of text to be deleted" and "part of text to be newly displayed".

The determination about whether the image-moving processing or the redisplaying processing is selected depends on a processing time taken in moving the text image, a processing time taken in redisplaying the text, and any selected one of a paragraph unit, a layout line unit, a character string unit, a character unit or a compound one on which the text image is moved. More text image movement done on a more fine unit results in bringing about a sophisticated processing method.

Hence, the determination is required to be performed in light of the character-displaying processing speed, the image-moving processing speed, the sophistication degree of the processing method, and the storage capacities of the before-edition text layout information storing unit 16 and the after-edition text layout information storing unit 15.

Next, at a step r3, the "part of text to be deleted" is deleted from the image area. The image is deleted at each fine area for reducing overhead. The image area to be deleted is grouped as blocks for increasing a processing speed. In succession, the steps r4, r5, and r6, the document editing machine serves to process the "part of text to be moved".

That is, the moving sequence of the text image areas is determined so that the text image areas are moved in the determined sequence. The text image is moved at each fine area for reducing the overhead and the text image areas to be moved are grouped as blocks at the step r5. In case the system is arranged to save the before-edition display image and the after-edition display image of the display image storing unit 18, it is unnecessary to consider the sequence of moving the text image areas, thereby allowing the processing to be simplified.

Further, such a system is capable of processing the text whose location is changed as the "part of text to be moved" without dividing it into the "part of text to be relocated". Then, the "part of text to be newly displayed" is processed by reading the raster images for the new text. Lastly, the before-edition test layout information is updated as the after-edition test layout information.

In a case that the edition has even a little effect on the text, that is, the edition makes an effect on a paragraph only and does not increase or decrease any line, it is necessary to only recompose the text from the effected line to the last of the paragraph.

Further, in a case that the lines are increased or decreased, it is unnecessary to relocate (recompose) the character string of the text except the text to be edited. That is, it is necessary to only move the layout line.

In particular, in a case that there is no factor for reducing the length of a layout line, that is, no frame overlapped with the part of a paragraph except the paragraph containing the text to be edited, it is necessary to only move the layout line.

Figure 4B:
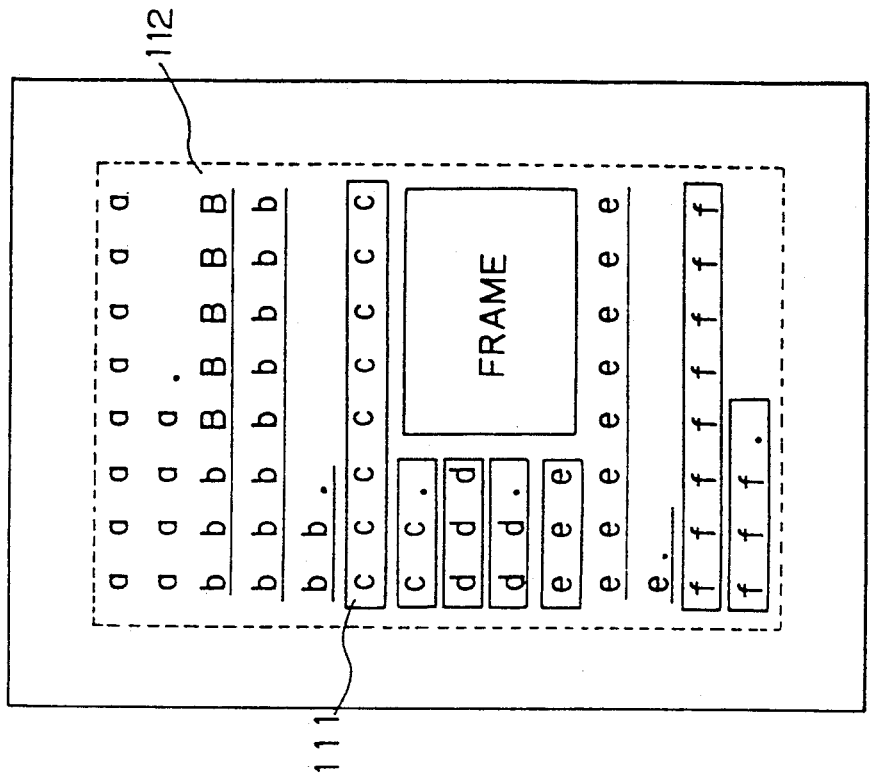
FIGS. 4A and 4B are views for explaining examples of a page to be edited and an edited page by using the apparatus shown in FIG. 1.
Figure 4A:
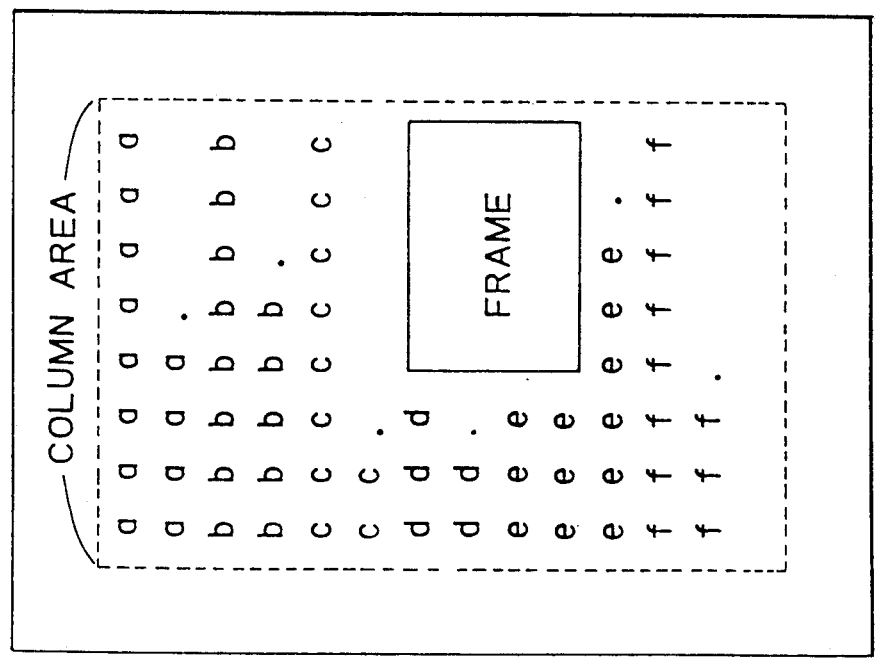

In the FIGS. 4a and 4b, the text shown in FIG. 4a has five characters to be added at the place where is located between the third b and the fourth b at the third row from the top.

The edited text is shown in FIG. 4b. The line indicated by a reference number 111 is a result of moving a layout line. The line indicated by a reference number 112 is required to be relocated. The determination about whether or not the layout line is moved depends on whether or not the same form area as the before-edition line area can be obtained in the paragraph.

However, in a case that a line contained in a paragraph is required to be moved as well as relocated, the lines contained in the later paragraph are also required to be relocated.

FIG. 5a shows the structure of the before-edition text layout information stored in the before-edition text layout information storing unit 16.

FIG. 5b shows the structure of the after-edition text layout information stored in the after-edition text layout information storing unit 15.

In the before-edition text layout information shown in FIG. 5a, the reference numeral 41 is the location of a line and indicates a coordinate of a reference point (a lower left point) of the line. A reference numeral 42 is a height of a line and a reference numeral 43 is a length of a line. A reference numeral 44 is a processing flag indicating that the line is to be deleted or moved. A reference numeral 45 indicates character string information containing character codes, character attributes such as type styles or sizes required for displaying the characters, and character feeding.

In the after-edition text layout information shown in FIG. 5b, the content of the processing flag 15 indicates that the line is to be displayed or located. The editing unit 12 receives the document data stored in the document data storing unit 14 and the before-edition text layout information stored in the before-edition text layout information storing unit 16 in accordance with an indication given by an operator and outputs the document data and the after-edition text layout information to the corresponding storing unit.

At a time when the editing unit 12 passes the following information to the display processing unit 13.

(1) After-edition text layout information (see FIG. 5b)

This layout information is given to only the range in which the text is actually recomposed, that is, the attributes or the locations are changed. This information is given on a line basis as shown in FIG. 5b.

In a case that the information is empty, it is unnecessary to newly display the character string or move the character string (when one line located at the end of a sentence is deleted, the after-edition text layout information is often left empty).

Figure 5C:

(2) The text range to be recomposed (see FIG. 5c)

Figure 5D:
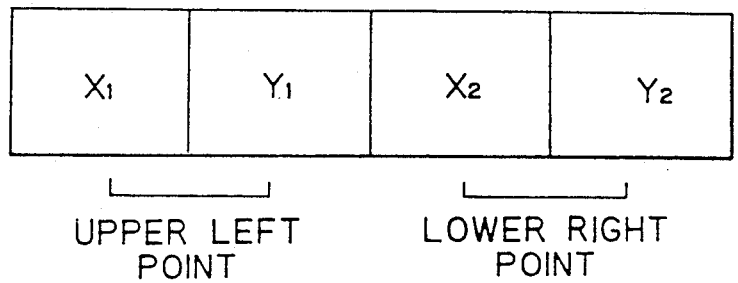
Figure 5E:
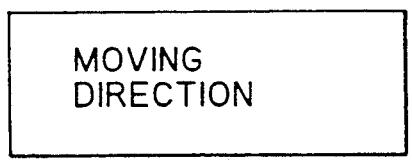

It means that a pair of a start line and an end line contained the before-edition text layout information, or it means that the range of the before-edition text in which the attributes or the locations are changed, that is, the recomposed text range. In editing the character string, in general, the start line is a head line of the text range to be edited in response to the operator's indication. If, however, one of the forbidden characters located in a line head or a line end makes an effect on the previous line, the previous line is a start line as shown in FIGS. 5d to 5e.

For example, when the type style and the decoration attributes of the character string are changed from the text shown in FIG. 6a to the text shown in FIG. 6b or vice versa, the line including the character string to be edited for changing the attribute is to be recomposed.

FIGS. 7a and 7b show the Japanese sentences corresponding to English translated sentences together in order to clearly demonstrate one of the characteristics of the editing capability of the present invention. In FIGS. 7a and 7b, a comma "," located at the second line belongs to the line head forbidden character. Hence, a Japanese Hirakana character "り" (indicated by a reference number 131) is overflown from the first line to the second line, resulting in making the line spacing of the first line wider than that of the second line. By deleting the comma ",", as shown in FIG. 7b, the Hirakana character "り" is returned to the first line so that the character spacing of the line is changed. It results in changing the start line of the text to be recomposed into the first line of the text.

FIGS. 8a and 8b show the Japanese sentences corresponding to English translated sentences together in order to clearly demonstrate one of the characteristics of the editing capability of the present invention. FIG. 8a shows the text including a line end forbidden character of "(". The "(" located at the third line of the text is expelled from the second line so that the character spacing of the second line is made wider than that of the other lines. By deleting a character string indicated by a reference 141 from the text, as shown in FIG. 8b, one character is returned to the second line and thereby the character spacing of the second line is changed. It results in assuming the second line as a start line of the text to be recomposed.

In a case of performing a frame edition such as a creation, a deletion, a change of a size of and a movement of the frame, the start line for the frame edition is the nearest line to the text head of the lines whose length is changed by the frame edition. The end line is the last line of the lines whose attributes and locations are changed or of the screen or page (that is, the last line contained within the before-edition text layout information).

Figure 9A:
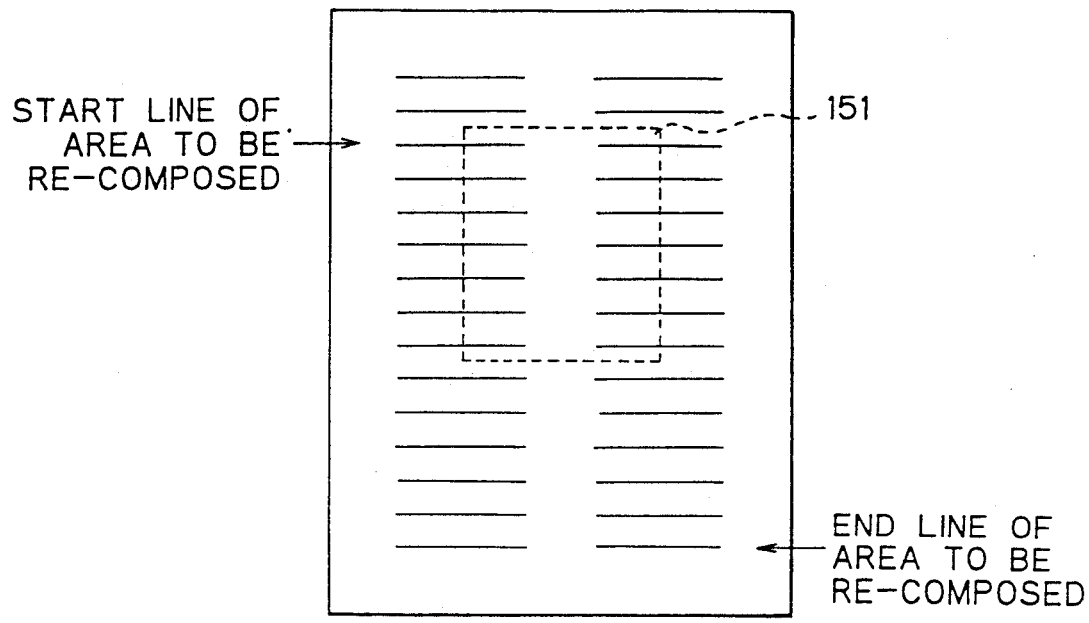
FIGS. 9A and 9B are views for explaining examples of a page to be edited and an edited page by using the apparatus shown in FIG. 1.
Figure 9B:
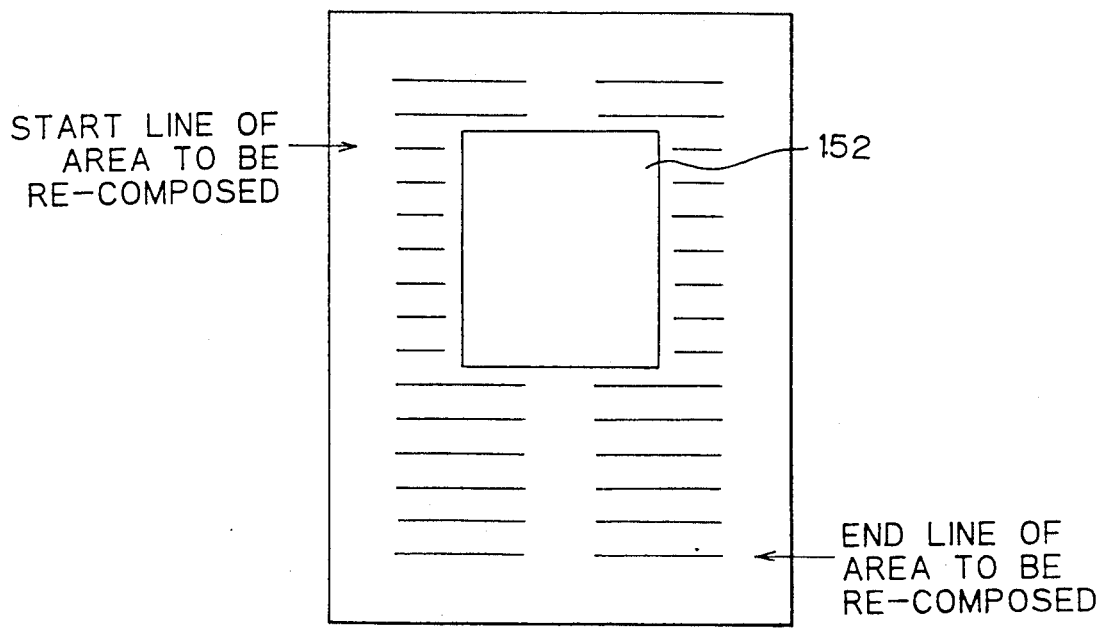

FIG. 9a shows a start line and a last line of the text to be recomposed in case of creating a frame indicated by a reference 151. FIG. 9b shows the range of the text to be recomposed in case of deleting a frame indicated by a reference 152.

Figure 10:
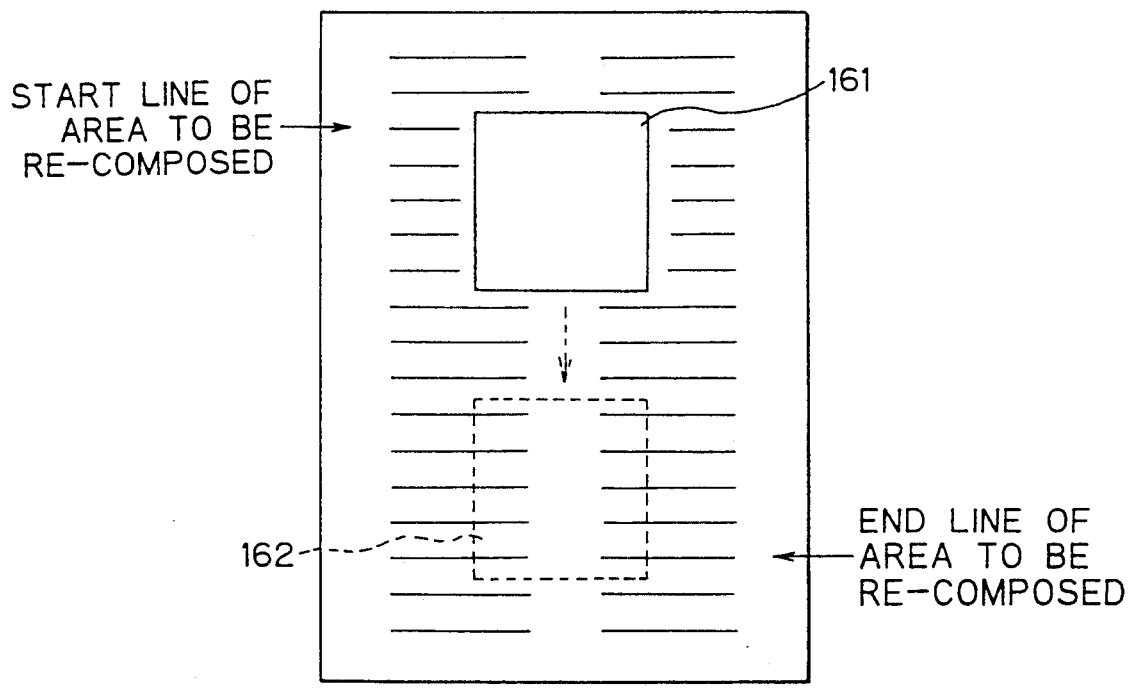
FIG. 10 is a view for explaining an example of a page to be edited by using the apparatus shown in FIG. 1.

FIG. 10 shows the range of text to be recomposed in case of moving a frame indicated by a reference 161 to the location indicated by a reference 162. In case of moving a character string to the last of the text, for example, the character string has no effect on the text before and after the input character string, thereby leaving the range of text to be recomposed empty.

(3) Before-edition text layout information (see FIG. 5a)

A processing flag is set (as a character deletion or a movement) about the range of the to-be-recomposed text contained in the before-edition text layout information.

(4) Text deletion area (see FIG. 5b)

It denotes an area in which text is to be deleted. This area includes a pair of an upper left coordinate (X1, Y1) and a lower right coordinate (X2, Y2). It unit that priority is placed on movement of the content enclosed in the frame in a case of performing a movement edition of the frame having a photograph or other text therein and therefore the text at the new location of the frame is deleted. This area is unnecessary if the content in the frame is empty or a priority is placed on the text outside of the frame.

(5) Direction of Image Movement of Text (see FIG. 5e)

This information indicates which one of the movement from a text head to a text end (→), the movement from the text end to the text head (←), the movement mixed of those two (→←, ←→), or no movement the image movement of text takes. (This information is a flag for increasing a processing speed and is not essential in edition).

The direction (sequence) of the image movement is determined on the following process.

In a case that the text (lines) is increased in the area intended for character-string edition such as an insertion, a copy, a substitution, and a change of a character size of a character string, or a character spacing or a line spacing is made wider as a result of changing a format such as the character spacing or the line spacing, the character string is effected by creating the frame and changing the frame size.

In a case that the area (lines) is increased, the movement of a character string takes only the movement from the sentence head to the sentence end (→). On the other hand, in a case that the area (lines) is decreased as a result of performing character string edition such as a deletion, a substitution, and a change of a character size of a character string, or in a case that the character spacing or the line spacing is decreased as a result of changing the format, a deletion of a frame and a change of a frame size have an effect on the character string.

In a case that the text area (lines) is decreased, the text movement takes only the movement from the sentence end to the sentence head (←).

In a case that no text area (lines) is increased or decreased as a result of the above editions, no line is moved.

For moving a character string or a frame, in general, it is necessary to take the movement in opposite directions, since the one-way movement merely allows part of the character string to be moved.

For the text (line) relocated by the editing unit, the processing flag 44 of the before-edition text layout information is set to a character deletion mode and the processing flag 54 of the after-edition text layout information is set to a character display mode.

For the text (line) processed by moving a layout line, the processing flag of the before-edition text layout information is set to an image movement mode and the processing flag 54 of the after-edition text layout information is set to an image movement mode.

For the text (line) newly emerged as a result of inserting or copying a character string and reading text, the processing flag 54 of after-edition text layout information is set to a character display mode. (No before-edition text layout information exists for the line). For the text (line) deleted as a result of performing deletion or cutting edition, the processing flag 44 of the before-edition text layout information is set to a character deletion mode. (No after-edition text layout information exists for the line).

For the text (line) overflown from the screen or page as a result of performing edition such as an insertion and a copying of a character string and an insertion of a frame, the processing flag 44 of the before-edition text layout information is set to a character deletion mode. (No after-edition text layout information exists for the text). For the text (line) newly entered into the screen or page as a result of performing edition such as a deletion or a cutting of a character string and a deletion of a frame, the processing flag 54 of the after-edition text layout information is set to a character display mode. (No before-edition text layout information exists for the text).

As shown in FIG. 11, in a case of creating a two-column heading 175 or a frame for the heading, the text-flowing direction is changed. The text is flown in sequence of 171, 172, 173, and 174. For recomposing the text, it is necessary to only move the layout line. For redisplaying the text with an image movement method, it is necessary to replace the image of 172 with the image of 173, resulting in requiring at least part or all of the image to be saved or deleted.

This processing illustration employs a method of deleting all the text image of 172, moving the text image of 173 to the location of 172, and displaying a character string. In deleting and displaying a character string, it is better to select a shorter processing time for deleting and displaying the character string. In this illustration, for simplification, the description will be directed to the image-movement processing with priority being placed on the head of the text. That is, the text to be deleted and displayed is determined on the following routine.

Figure 12A:
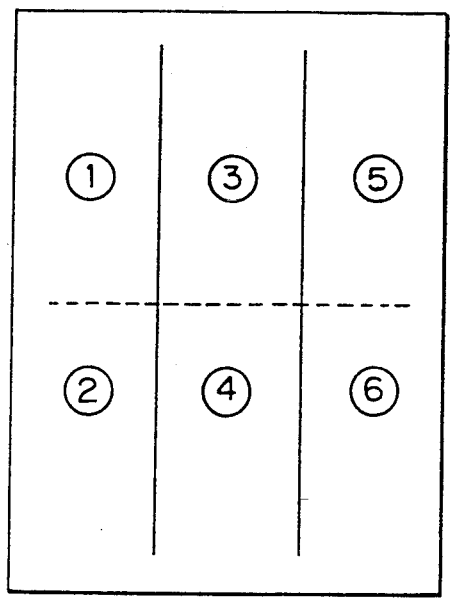
FIGS. 12A and 12B are views for explaining examples of a page to be edited and an edited page by using the apparatus shown in FIG. 1.
Figure 12B:
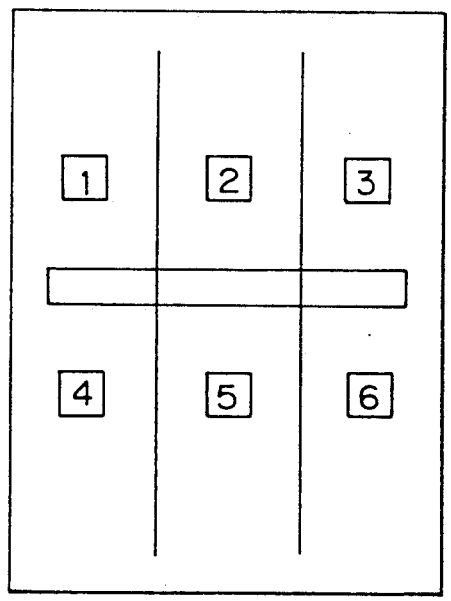
Figure 13:
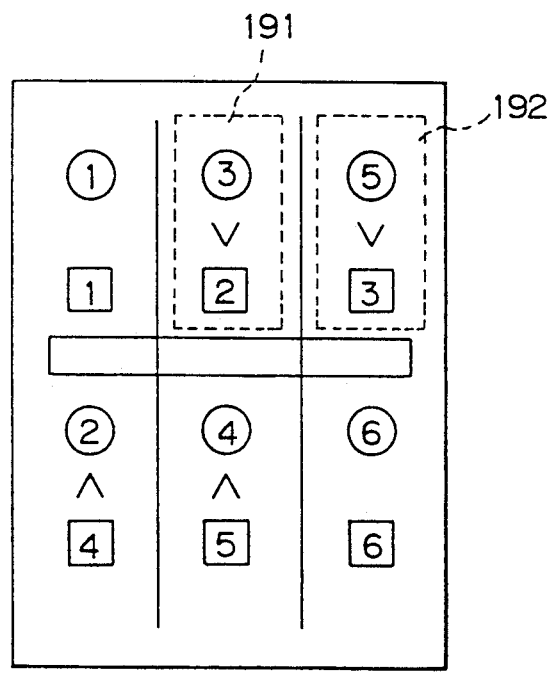
FIG. 13 is a view for explaining an example of a page being edited by using the apparatus shown in FIG. 1.

The text flow shown in FIG. 12a (figures enclosed in circles indicate the flowing sequence) is changed into the text flow shown in FIG. 12b (figures enclosed in circles indicate the flowing sequence). At a time, as shown in FIG. 13, the sequence before edition is compared with the sequence after edition. In a case that the sequence before edition is larger than the sequence after edition, the before-edition character string contained in the areas 191, 192 shown in FIG. 13 corresponds to the text to be deleted and displayed.

Figure 14A:
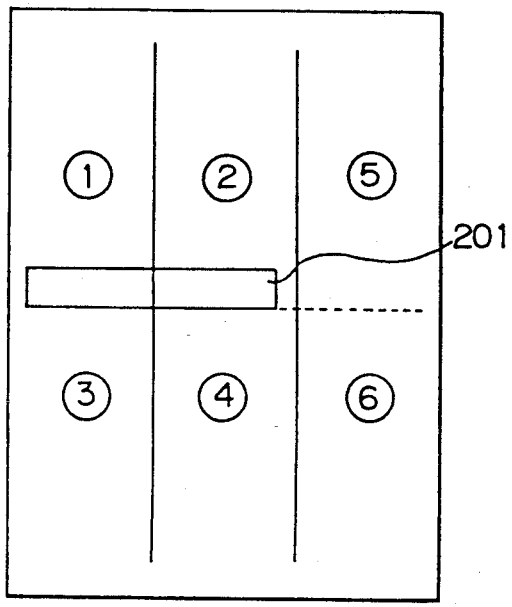
FIGS. 14A and 14B which are views for explaining examples of a page to be edited and an edited page by using the apparatus shown in FIG. 1.
Figure 14B:
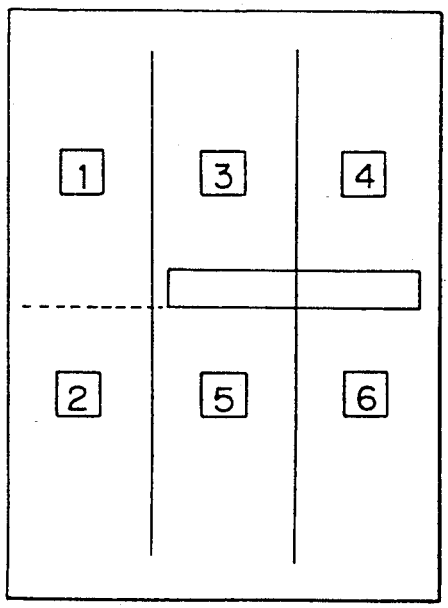
Figure 15:
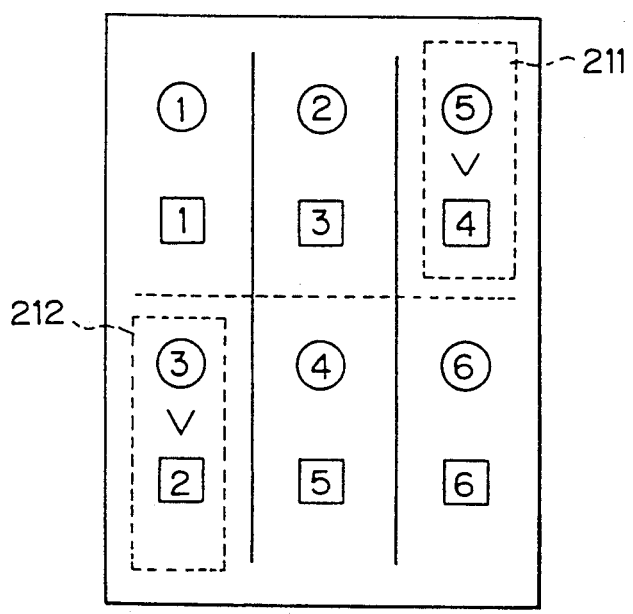
FIG. 15 is a view for explaining an example of a page being edited by using the apparatus shown in FIG. 1.
Figure 16:
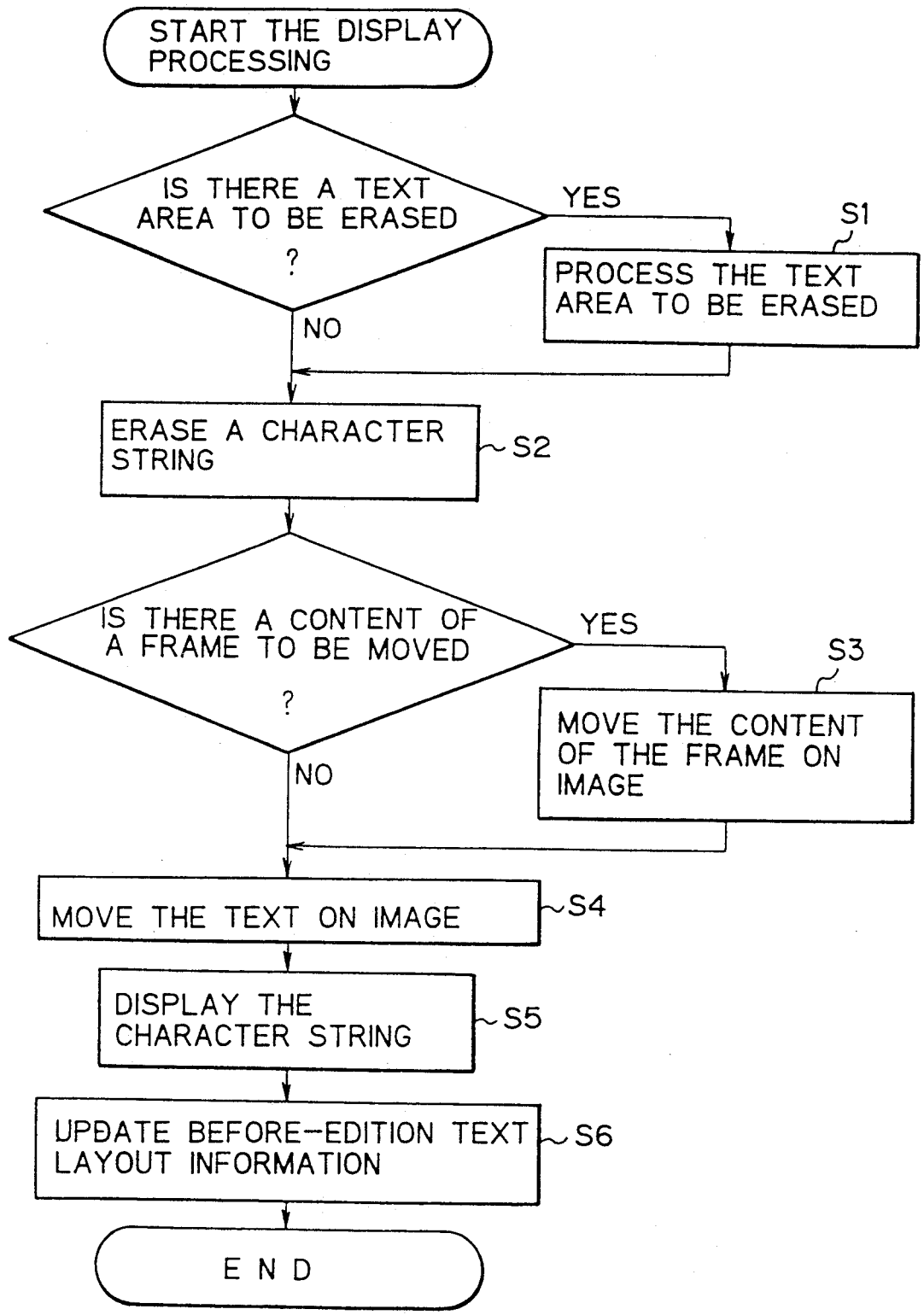

In a case that the frame 201 is moved from the location shown in FIG. 14a to that shown in FIG. 14b for changing the text flow, the before-edition character string contained in the areas 211, 212 of FIG. 15 corresponds to the text to be deleted and displayed.

The text to be deleted and displayed is obtained in the editing unit 12. Though the text is recomposed on the basis of the layout line movement, for the obtained text, the processing flag 44 of the before-edition text layout information is set to a character deletion mode and the processing flag 54 of the after-edition text layout information is set to a character deletion mode.

Next, the displaying procedure will be described in accordance with the flowcharts of FIGS. 16 to 21.

(1) In a case that there exists the text to be deleted under the condition that a priority is placed on the image movement of the content of the frame, the processing (s1) is executed against the text area to be deleted. That is, the before-edition text layout information for the text area to be recomposed is searched so as to find that a line has the processing flag 44 set to the image movement mode and is contained in the to-be-deleted text area. If any, for the found line, the processing flag of the line contained in the before-edition text layout information is set to a character deletion mode and the processing flag 54 of the corresponding line contained in the after-edition text layout information is set to a character display mode.

(2) For a line to be deleted, a character-string deleting processing (s2) is executed. That is, the before-edition text layout information of the text area to be recomposed is searched from the head to the end so as to delete the raster image of the line whose processing flag 44 is set to the character deletion mode from the display image storing unit 18.

In deleting the line raster image, more continuous lines for increasing a processing speed are grouped as blocks. In a case that the edition such as a deletion, a size change, and a movement of a frame requires the image of the content enclosed in the frame to be deleted, the image of the text area is deleted.

(3) In a case that the image of the content enclosed in a frame is to be moved as a result of the edition such as frame movement, the moving processing (s3) of the content image is executed.

Figure 17:
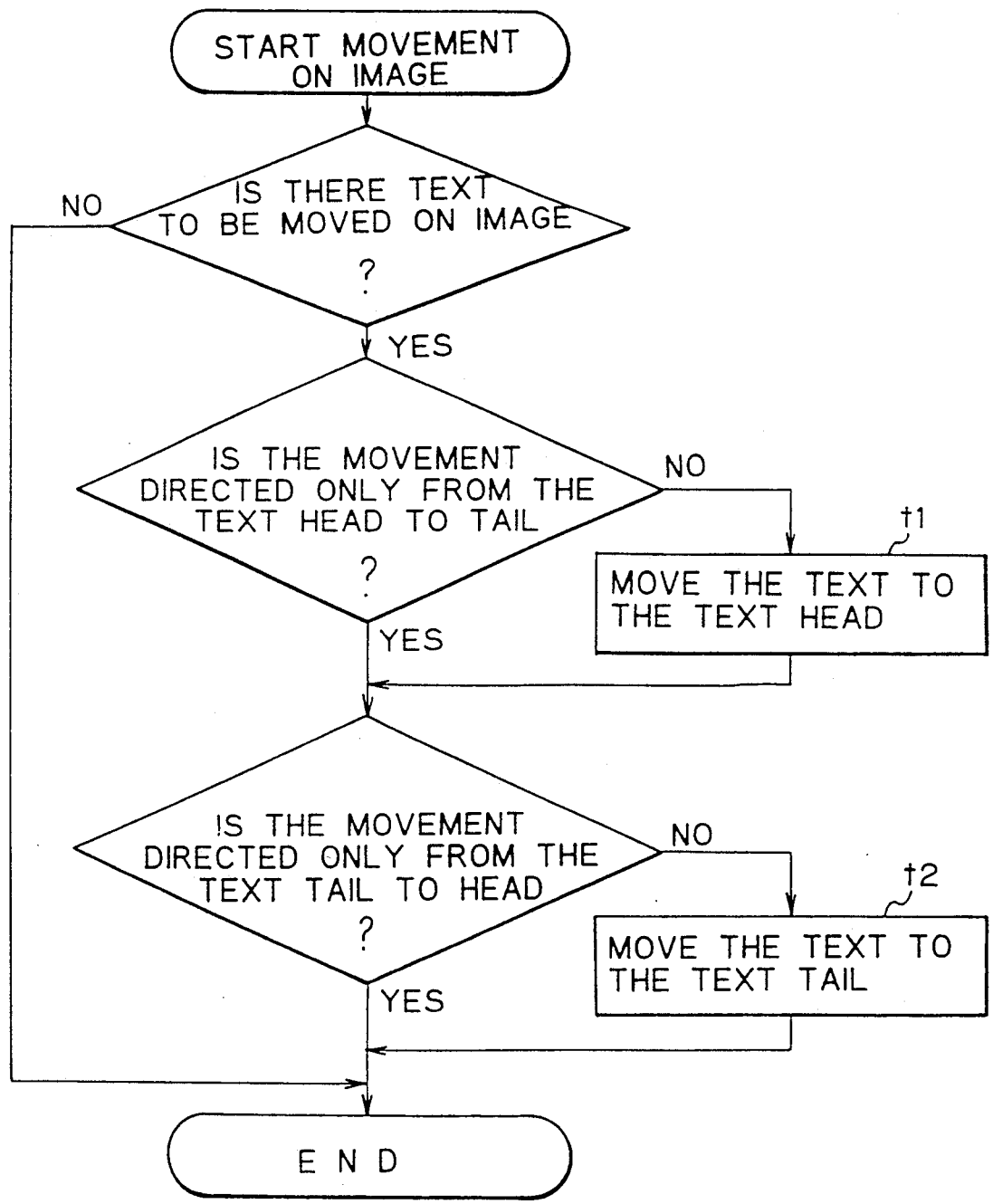

(4) The image of a character string is moved (s4). FIG. 17 shows the detail of the image movement processing. In a case that the image of the text (line) is required to be moved, the image movement of the text is divided into the moving processing toward the text head (t1) and the moving processing toward the text end (t2). This is for preventing an unmoved image (to be moved later) from being deleted (broken) by the image movement.

However, when the image movement is directed only from the text head to the text end, the image movement directed to the text head is left out. When the image movement is directed only from the text end to the text head, the image movement directed to the text end is left out. The image movement directed to the text head is shown in FIG. 18 which is consisting of FIGS. 18A and 18B.

Figure 19B:
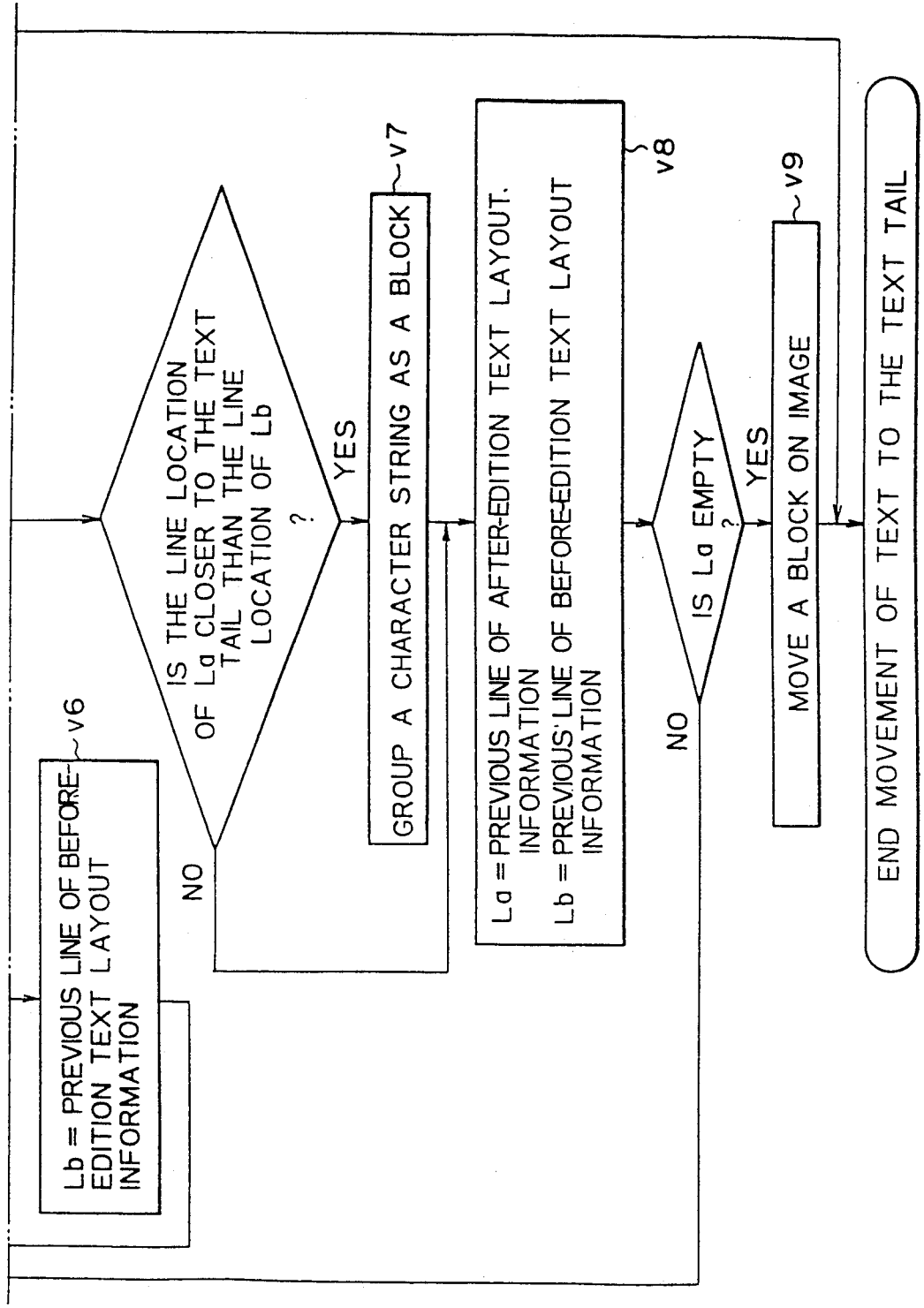
Figure 21:
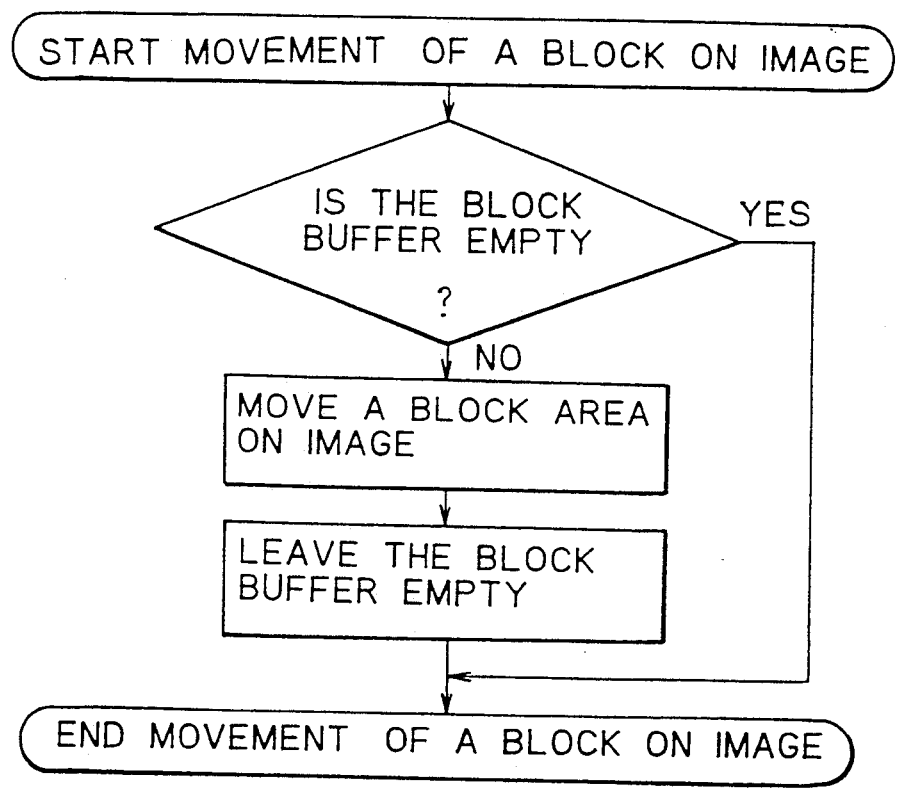

The grouping of the continuous lines as blocks is shown in FIG. 19 which is consisting of FIGS. 19A and 19B.

The image movement of the block is shown in FIG. 20. The image movement directed to the text head takes the steps of comparing the line location in the after-edition text layout information with the line location in the before-edition text with respect to each line to be moved in sequence from the heads of the after-edition text layout information and before-edition text layout information (u2, u4, u6, u8 shown in FIG. 18).

If the compared result indicates the lines are moved toward the text head, the lines are grouped as blocks (u7 in FIG. 18). The image of the lines are moved on the block basis (u3 and u5 in FIG. 18 and w2 in FIG. 20). Since only the continuous lines are assumed to be grouped as blocks, if the lines to be moved are interrupted, the image of the block is moved at the interrupting time.

Before ending the image movement, the image of a block left in the buffer is moved (u9).

There are three conditions (w1) that the grouping of the content of the buffer as blocks in FIG. 20 is made possible.

First, the line being currently grouped as blocks and the one before the grouped line registered in the buffer are at the same column. Second, the line lengths of the lines are equal. (This second condition is a constraint provided only if the lines in a rectangular area are grouped as blocks. Hence, this constraint is unnecessary if the lines in a polygon, for example, are allowed to be grouped as blocks). Third, the line spacing of the after-edition text layout information is equal to that of the before-edition text layout information.

The movement of the lines toward the text end takes the substantially similar step to the movement toward the text head except that the start line to be processed is the last line contained in the after-edition text layout information and the before-edition text layout information (v2, v4, v6, v8). (see FIG. 19).

(5) The remaining non-displayed lines are displayed (s5). That is, the after-edition text layout information is checked in sequence from the text head. For the line having the processing flag 54 set to the character display mode, the font raster image for each character of the line is obtained for displaying a character string.

In a case that the edition such as pasting of a graphic to a frame, a change of a frame size, or a movement of a frame requires the content of the frame to be displayed (or redisplayed), at this stage, the content of the frame will be displayed.

(6) Lastly, the before-edition text layout information is updated so as to suit to the edited screen or page. That is, the to-be-recomposed text area contained in the before-edition text layout information is replaced with the after-edition text layout information.

This replacement is carried out by providing a pointer in the text layout information storing units 15, 16 respectively and switching the pointer through the effect of the editing unit. It results in allowing the after-edition text layout information to be easily updated as the before-edition text layout information without physically replacing the content of the after-edition text layout information storing unit 15 with the content of the before-edition text layout information storing unit 16.

The aforementioned processing makes it possible to increase the processing speed as a result of reducing the text to be relocated as well as to be displayed by obtaining the font raster image of each character, as compared with the known document editing machines by the present inventors.

In turn, more concrete embodiment will be described with reference to FIGS. 22 and 23.

Figure 22:
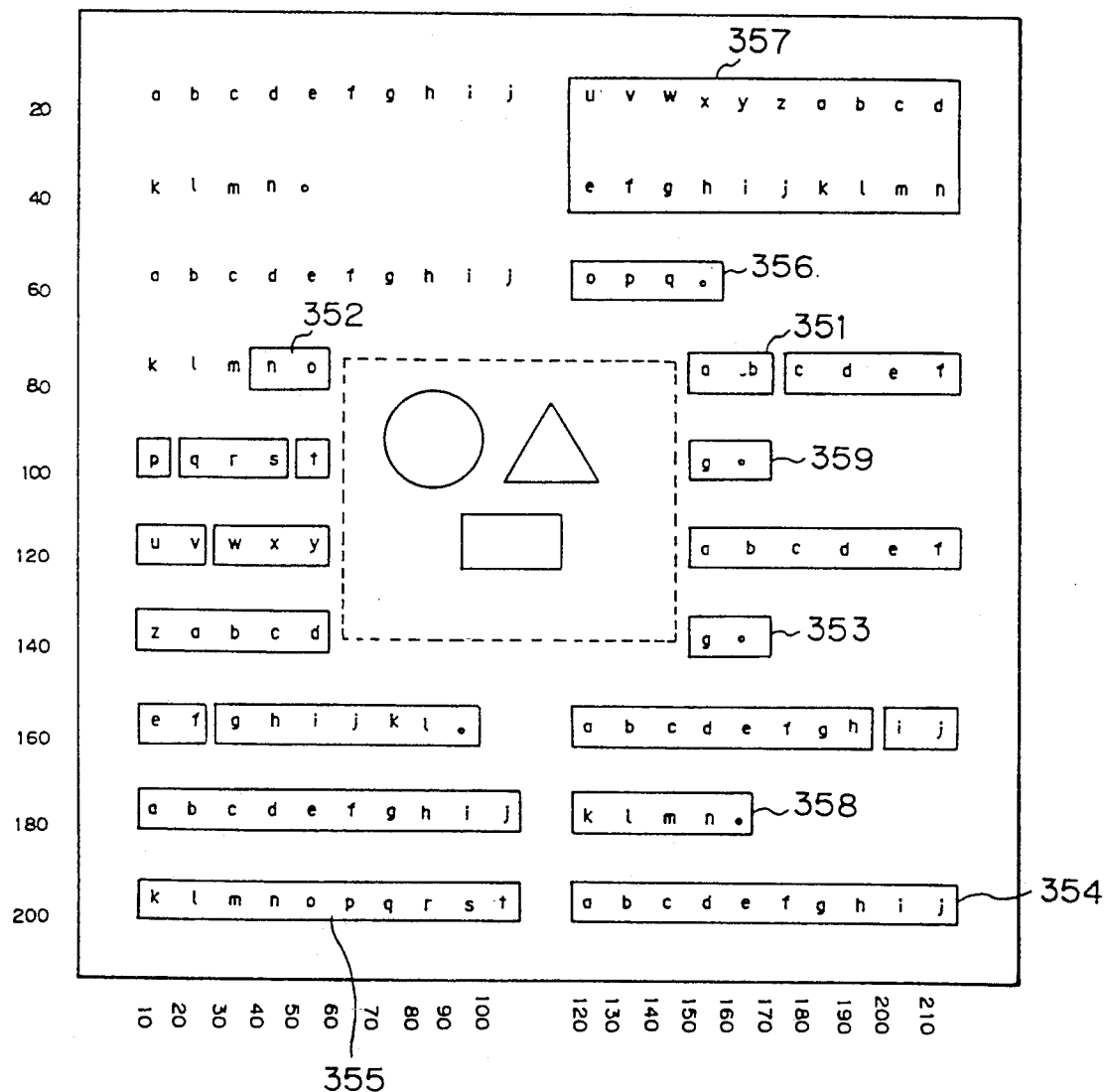
FIGS. 22 and 23 are views showing a layout state of characters by using the apparatus shown in FIG. 1.
Figure 23:
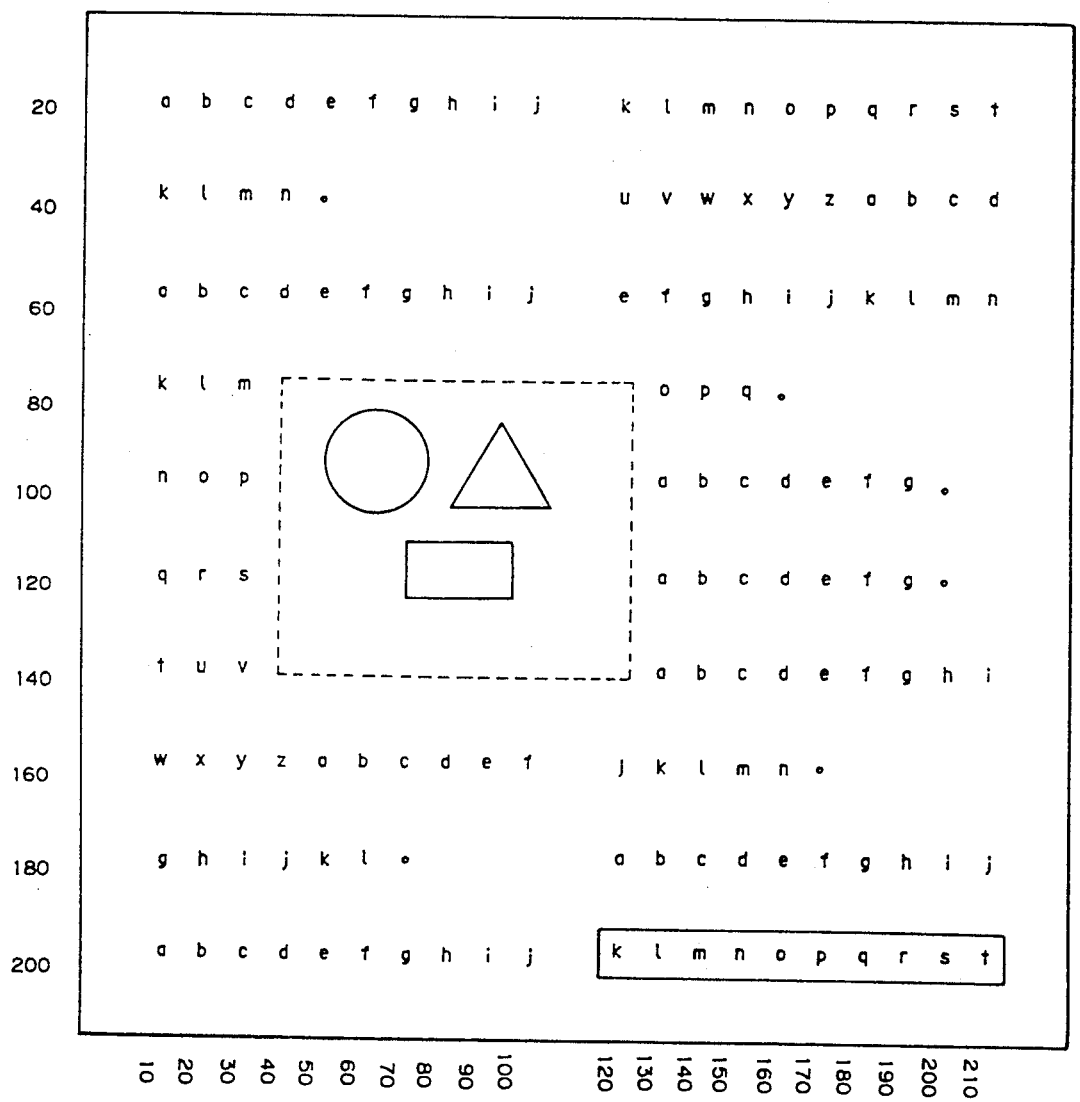

FIG. 22 shows the before-edition displaying state. As shown, a two-column frame is located at the center of the screen. Consider that the central frame is moved lefty by two characters by an operator and is edited as shown in FIG. 23.

When the operator indicates an edition through the input device 11, the editing unit 12 serves to create the after-edition text layout information to be stored in the after-edition text layout information on the basis of the before-edition text layout information stored in the before-edition text layout information storing unit 16 and the document data stored in the document data storing unit 14. The figures described on the lower side and the left side respectively represent an X-coordinate and a Y-coordinate on the coordinate. The part enclosed in a real line is processed as a batch in the sequence of each figure in a circle located at each upper right portion.

FIGS. 24 to 35 are flowcharts for illustrating the present embodiment. The area indicated by the reference 351 is transferred to the location indicated by the reference 352 as a result of executing the transfer according to the procedure illustrated in the flowcharts.

Figure 37B:
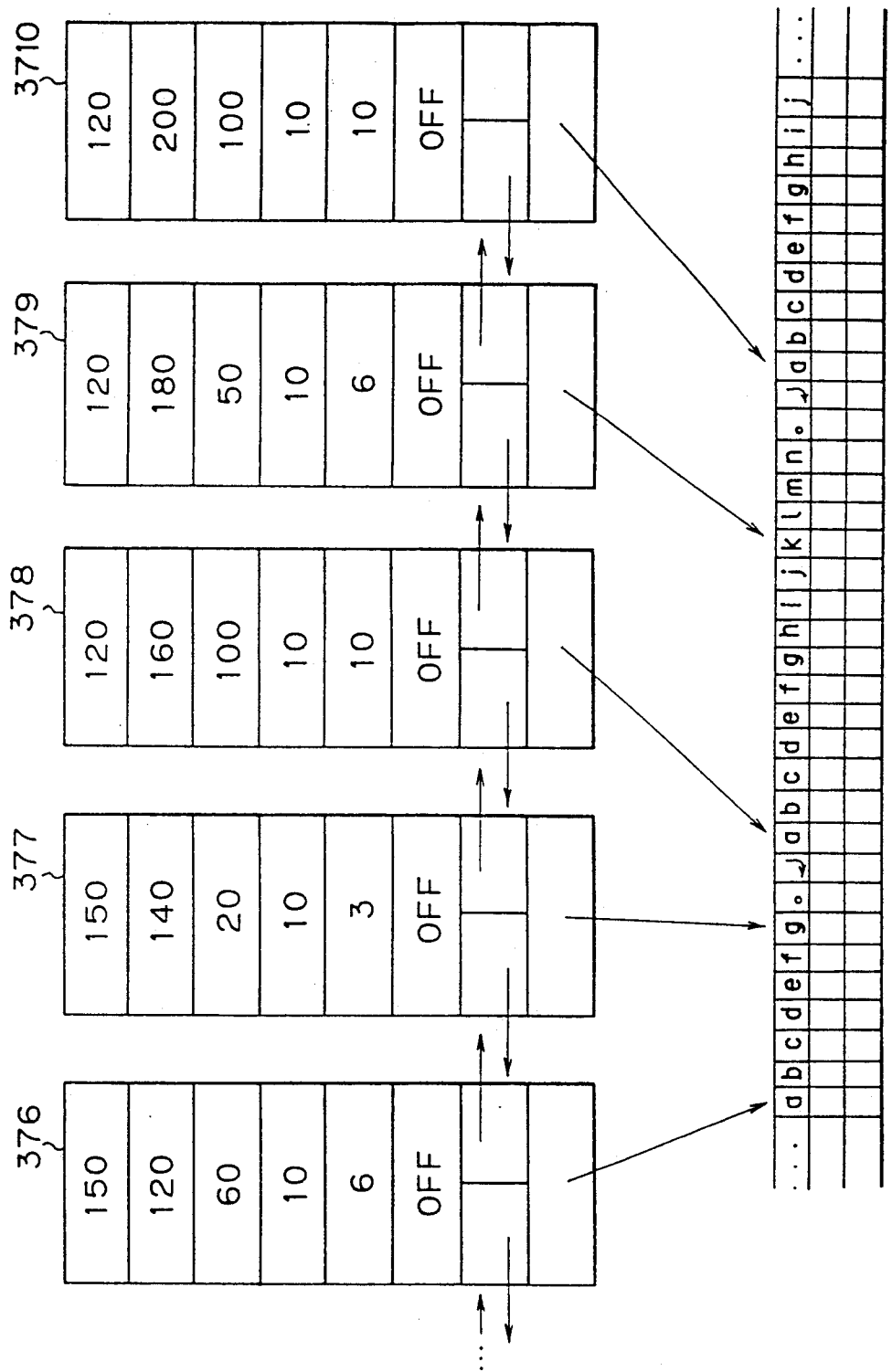

In the present embodiment, the before-edition text layout information is illustrated in FIG. 37. The after-edition text layout information is illustrated in FIG. 38.

In both FIGS. 37 and 38, reference numerals 371 to 3710 and reference numerals 381 to 3811 respectively denote lines. The portion denoted by each number contains an area for storing an X-coordinate, a Y-coordinate, a line length, a line height, the number of characters contained in a line, and a processing flag.

Figure 36:
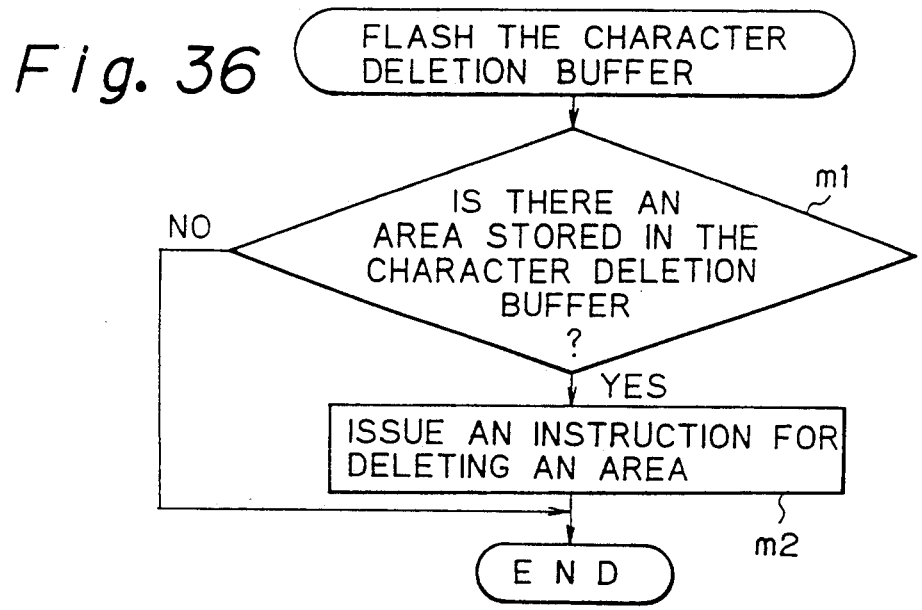
Figure 39:
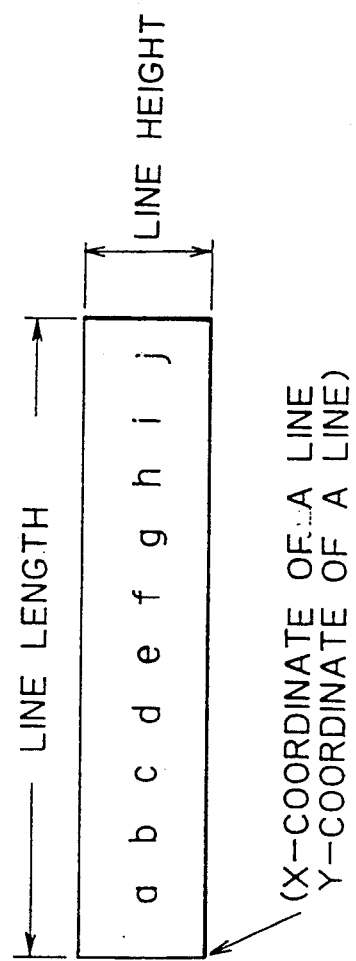

The area stores as a coordinate the coordinate of the lower left location of the line as shown in FIG. 39. Reference numerals 3711 and 3812 denote document data stored in the document data storing unit 14. The document data are composed of a character attribute area for storing a character feeding of each character or the like and an area for storing the processing flag. For easier understanding of the drawings, the document data is shown in FIGS. 36 and 37. But, it is the same in each of FIGS. 36 and 37. A symbol ↵ denotes a control code representing a line feed. At the initial state, the processing flag of each line and character is set to OFF.

Figure 40:
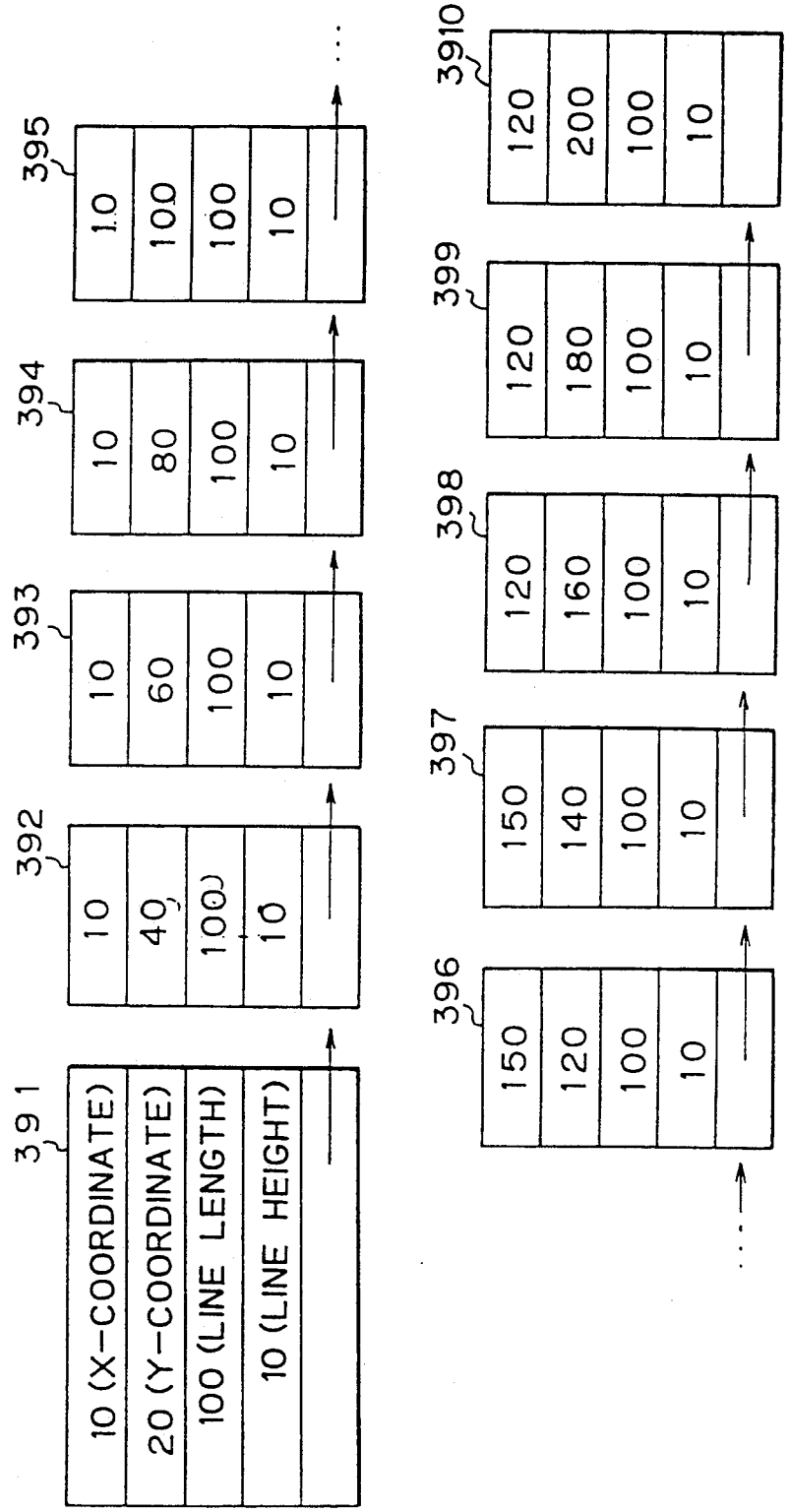

FIG. 40 shows an initial state of the using area managing unit 21. This information is created on the basis of the line information of the before-edition text layout information shown in FIG. 37 under the processing of a step g1 shown in FIG. 24.

Figure 24:
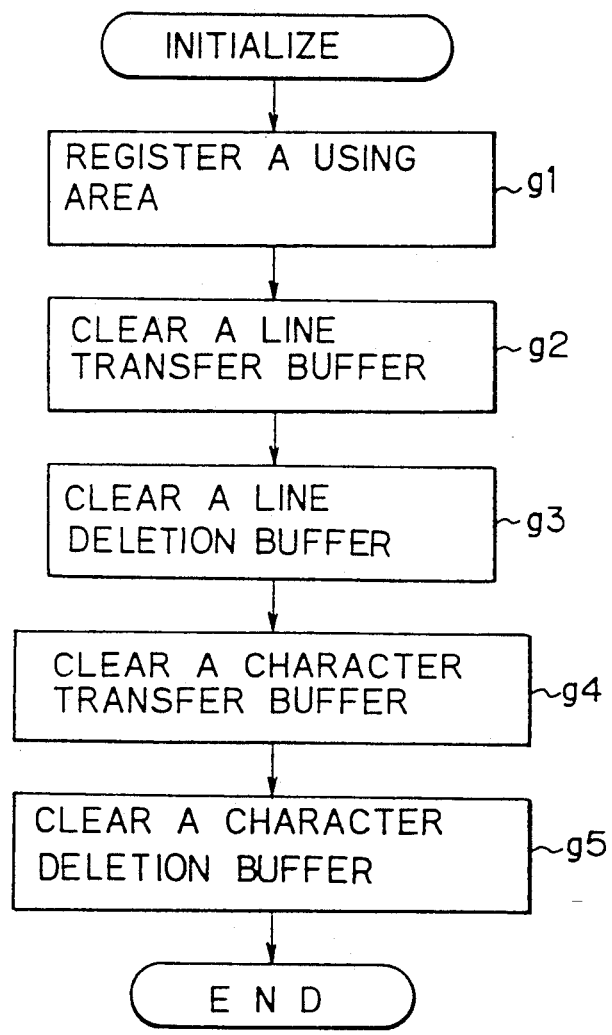

FIG. 24 shows a routine for initializing the data area used for redisplaying the line. At the step g1, all the lines displayed at a time are registered in the using area managing unit 21 as keeping those lines in the before-edition state.

For the line whose actual character string length is smaller than the width of a text-locatable area (meaning that the maximum length of an area allowing the text to be located), for example, the line containing a line-feed code served as a paragraph, the width of the text-locatable area is registered so that the transferring of the text in the reverse direction can be prevented as much as possible in the processing of transferring the half document from the end to the head. At the steps g2, g3, g4 and g5, it is possible to clear the buffer used for line transfer, line deletion, character transfer, and character deletion.

Figure 41:
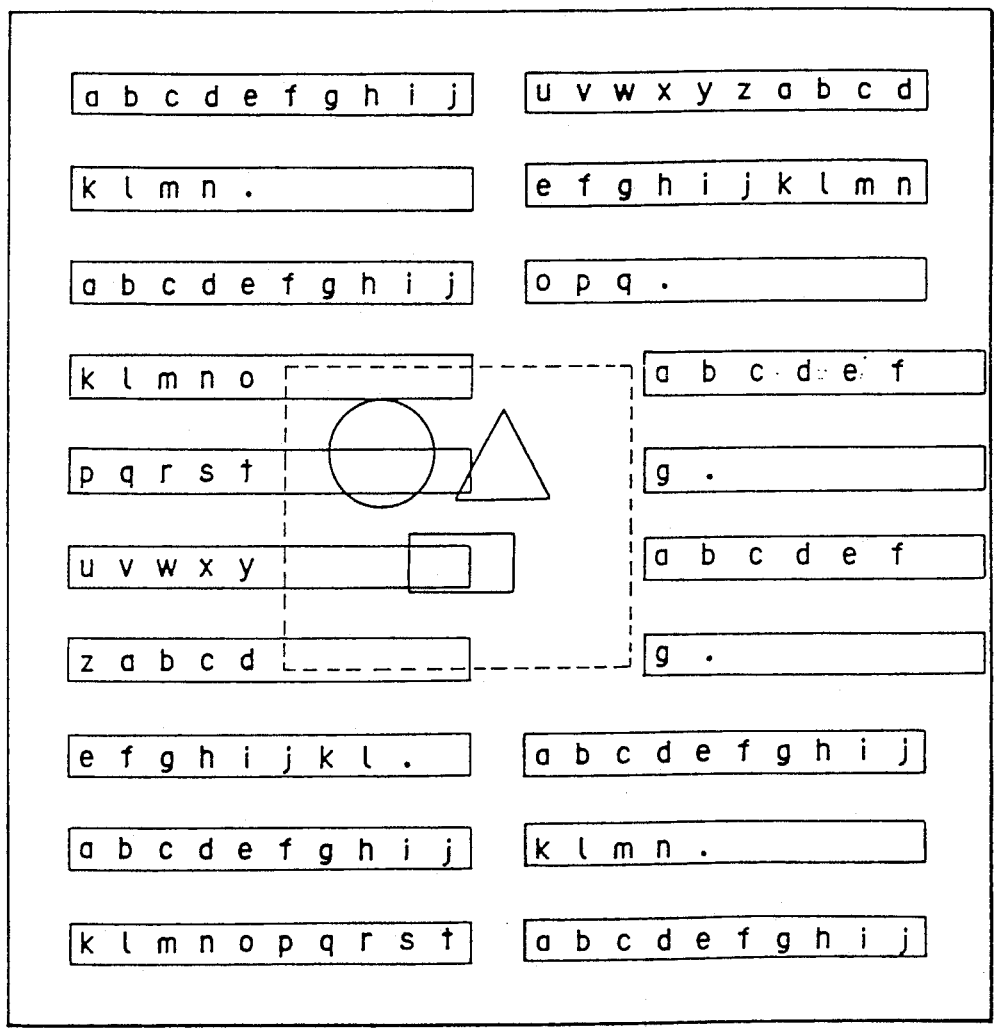

Concretely, the information about a line such as an X-coordinate, a Y-coordinate, and a line height is read from the before-edition layout information as shown in FIG. 37. The width of the text-locatable area (100 in FIG. 37) is stored as a line length. The pieces of information about each line are connected by pointers as shown in FIG. 40. It results in allowing each area composed as shown in FIG. 41 to be registered in the using area managing unit 21.

Further, the upper left and lower right coordinates are cleared as zero (0) in the buffer used for line transfer, line deletion, character transfer, and character deletion.

Figure 25B:
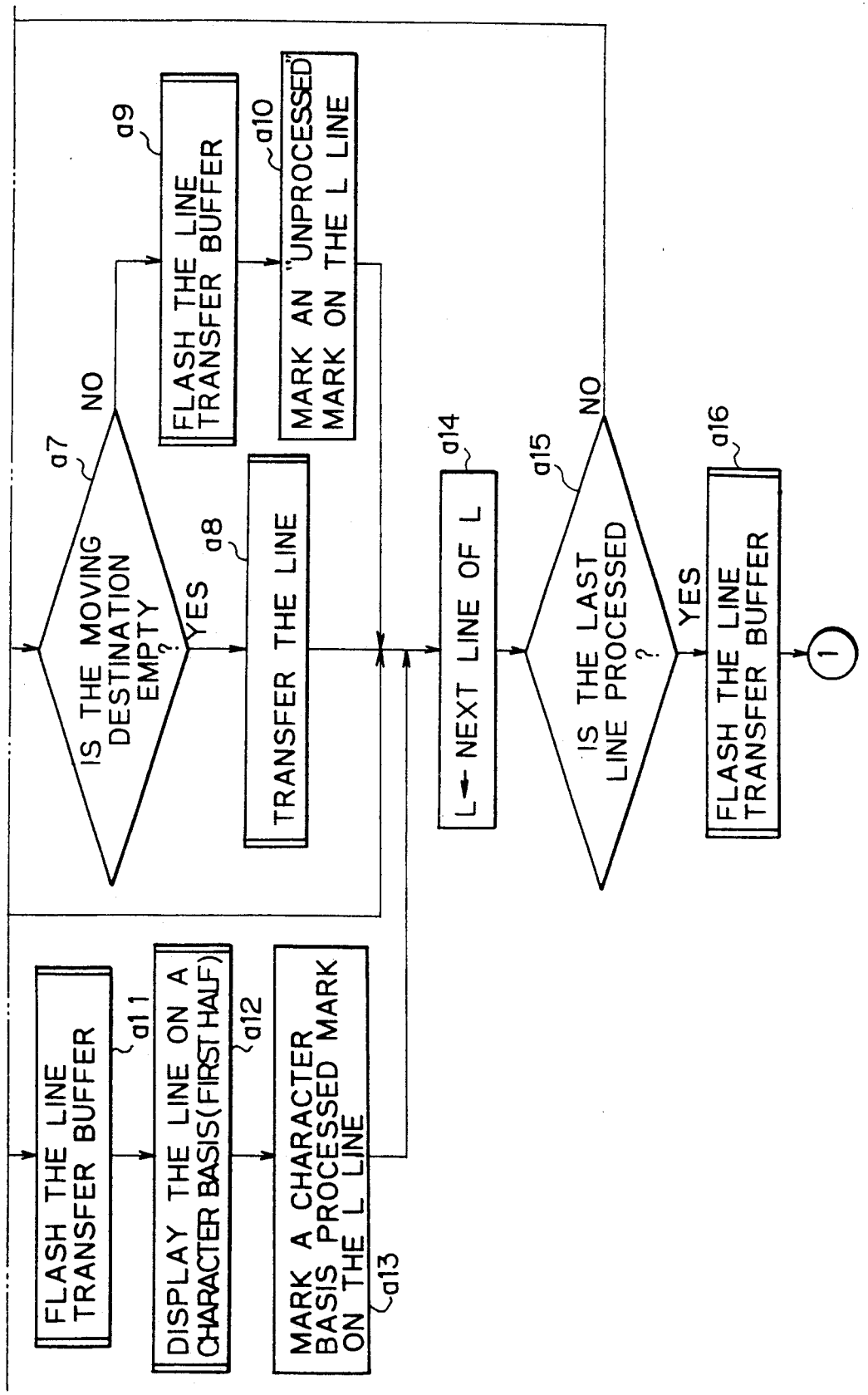

Turning to FIG. 25 which is consisting of FIGS. 25A and 25B, this is a flowchart for illustrating the first half of the redisplaying processing. In this first half part, the text is transferred from the farther location from the head of the document to the nearer location and the characters to be left intact are deleted.

At first, at a step a2, the actually edited character string disappears on the screen and the deleted area is erased from the using area managing unit 21.

At steps a3 to a16, it is checked whether or not the line or character string moved as a result of the edition can be transferred in sequence from the nearest line to the head of the document to the farthest line from the head of the document.

At the step a3, the information about the head line of the character string to be edited (a coordinate of a line, a line length, a line height, and a pointer indicating a head character) is read from the before-edition text layout information storing unit 16 to L.

At the step a4, a line L' corresponding to L is read from the after-edition layout information storing unit 18. Then, at the step a5, it is checked whether or not the line L' is allowed to be transferred.

The editing unit 12 serves to define the text area to be recomposed. That is, the starting line is a line in which a character string is inserted or deleted or its attribute is changed. Further, when the frame is created or moved, the starting line is the nearest line to the head of the document among the lines effected by the frame edition. The end location is the final location in the text area effected by the edition. For example, the recomposing processing may terminate if the space left after the line feed is wide enough to hold the character string increased by the edition.

However, the recomposing processing effects the subsequent paragraphs in sequence if the space left after the line feed is not so wide as holding the increased character string. In the worst case, it is necessary to recompose all the paragraphs and the character string ranging from the starting line to the last page.

Concretely, the line containing a character string indicated by a reference 352 in FIG. 22 is a start line. This line corresponds to the before-edition text layout information indicated by a reference 374 shown in FIG. 37 which is consisting of FIGS. 37A and 37B. Hence, the before-edition text layout information 374 is stored in L. And, the information about a coordinate, a length, a height, and a pointer indicating a head character of a line contained in the after-edition layout information 381 shown in FIG. 38 is input to L'.

As the line contained in the after-edition text layout information is changed in sequence from 381 to 382, and 383, the information about the line to be input to L' is kept changeable until the information satisfies the following formula:

---
(Pointer indicating a head character of a line input in L)
≧ (Pointer indicating a head character of a line input in L')
and
(Pointer indicating a head character of a line input in L)
≦ (Pointer indicating a head character of a line input in L') + (Number of characters contained in a line input in L')

---

In actual, when the line 384 is input in L', the information about the line satisfies the above formula. And, at the step a7, the data managed by the using area managing unit 21 is checked for finding a character located at the location of the line L' in the display image storing unit 18.

Concretely, at first, checking the head lines 391, 392, and 393 shown in FIG. 40 in sequence (assuming the line being checked as 1), if the information about all the lines satisfies the following formulas, it is determined that no character exists in a window buffer.

---
((X-coordinate of L')+(Line length of L')<(X-coordinate of 1) or (X-coordinate of L')>(Y-coordinate of 1)−(line height of 1))
and
((Y-coordinate of L')−(Line height of L')<(Y-coordinate of 1) or (Y-coordinate of L')>(Y-coordinate of 1)−(line height of 1))

---

When the character string 354 shown in FIG. 22 is processed, the information of the line 3811 is input to L' when the line 354 is processed. At this time, the information about the line 399 is deleted from the using area managing unit 22 shown in FIG. 40 at the step j6 of FIG. 33. The foregoing formulas are thus satisfied.

If no character exists in the location of the line L', the character string is transferred at a step a8. If not, the character string is required to be transferred from the nearer location to the head of the document to the farther location. This line is marked with an "unprocessed" mark at a step a10 so that it can be processed in the last half of the routine.

At the step a5, if it is determined that the transfer of the text is impossible, at a step a12, the process jumps to a routine for transferring the text on a character basis.

Then, at a step a13, a character-basis mark is marked on the line. Concretely, the "unprocessed" mark and the character-basis mark are given by setting to ON each field of the processing flag contained in an original line information (for example, 374 if the line 374 of FIG. 37A is input in L) form which the line L is read. In the line transfer processing at the step a8, for the lines to be continuously transferred, the information for transferring them as blocks is stored in a line transfer buffer 22.

Figure 42:
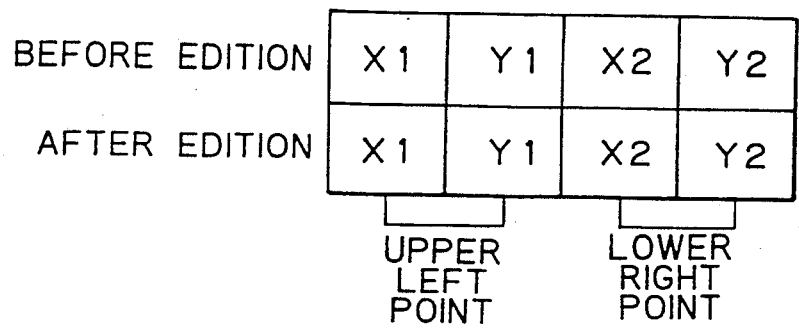

Concretely, the line transfer buffer 22 stores an upper left and a lower right coordinates of the area as shown in FIG. 42. Since, however, the line transfer buffer 22 stores the untransferable continuous lines to be transferred, it is necessary to eject the data from the line transfer buffer 22 if the process enters into the line transfer processing at the step a8. This ejecting process is carried out at the steps a9 and a11 shown in FIG. 25.

At a step a14, the next line of the latest checked line is read from the before-edition text layout information storing unit 16 and is input to L. At a step a15, it is determined whether or not the last line to be processed has been processed.

Concretely, the determination about the last line is implemented by tracing the pointers each indicating the next line, inputting the information about the next line to L, and checking the line being input in L. That is, since the line 3710 (see FIG. 37B) is indicated as an end line end, it is checked whether or not the just processed line is the line 3710. If it is not the last line, the process returns to the step a4.

Lastly, at a step a16, the data about the lines to be continuously transferred is ejected from the line transfer buffer 22.

Figure 26B:
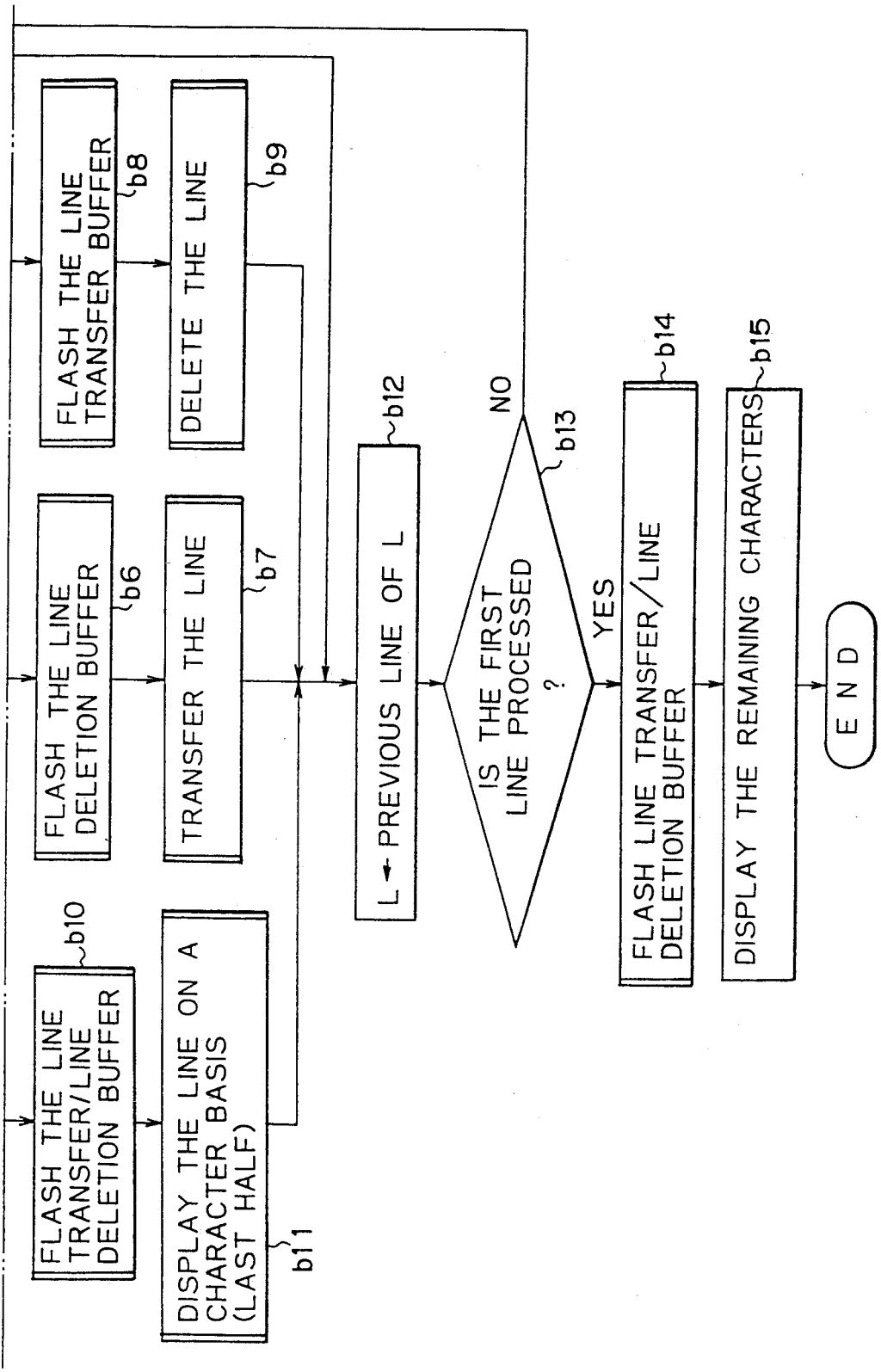

FIG. 26, which is consisting of FIGS. 26A and 26B, shows the last half of the routine for redisplaying the text. In the last half, unlike the first half, the text is transferred from the nearer location to the document head to the farther location and the newly input characters and the untransferable characters are displayed.

In a case that two or more characters or lines are replaced with other ones, the characters or lines are partially deleted and displayed and the remainings are transferred for realizing the redisplay of them.

In a case that the lines are replaced with others has been described with reference to FIG. 11.

At a step b1, the line moved from the displayed page to another page is deleted from the screen. The information about the line is also erased from the using area managing unit 21.

At steps b2 to b13, reversely to the first half of the routine, it is checked whether or not the characters moved through the effect of edition are allowed to be transferred in sequence from the farther line of the document text to the nearer line. At first, at the step b2, the information about a coordinate, a line length, a pointer pointing to a head character of the last line contained in the character string to be moved is read from the before-edition text layout information storing unit 16 to L.

Concretely, the information about an end line 3710 (see FIG. 37B) is input to L. At the step b3, it is checked whether or not the line is marked with the unprocessed mark. Then, the marked line(s) are processed at the steps b4 to b11. Next, at the step b4, it is checked whether or not the line is marked with the character-basis mark. If not, the line is processed on a line basis.

At the step b5, it is checked whether or not the location of the edited line L is overlapped with any other character in the using area managing unit 21 like the step a7 of the first half.

Concretely, checking the head lines 391, 392, and 393 shown in FIG. 40 in sequence (assuming the line being checked as 1), if the information about all the lines satisfies the following formulas, it is determined that no character exists in a window buffer.

((X coordinate of L')+(Line length of L')<(X-coordinate of 1) or (X-coordinate of L')>(Y-coordinate of 1)—(line height of 1))
and
((Y-coordinate of L')—(Line height of L')<(Y-coordinate of 1) or (Y-coordinate of L')>(Y-coordinate of 1)—(line height of 1))

Figure 44:
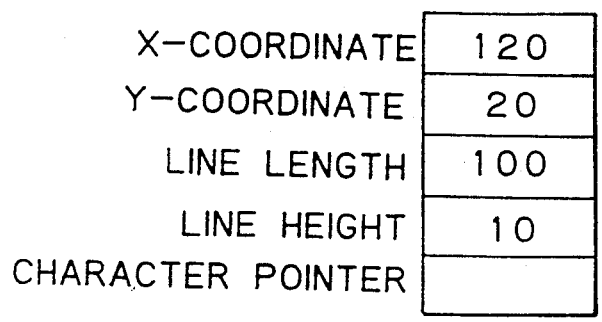

When the character string 354 shown in FIG. 22 is processed, the information shown in FIG. 44 is input to L' when the line 354 is processed. At this time, the information about this area is deleted from the using area managing unit 21 shown in FIG. 40 at the step c6 of FIG. 26.

The foregoing formulas are thus satisfied. If the location of the edited line L is not overlapped with any other character, the line transfer processing is carried out at a step b7. If overlapped, this line is not allowed to be transferred. Hence, at a step b9, this line is deleted.

At the step b4, if it is determined that the line is not allowed to be processed on a line basis, at a step b11, the line is processed on a character basis.

Like the steps a8, a9, a11 shown in FIG. 25, the line transfer is carried out at the steps b7, b8, and b10 by using the line transfer buffer 22. Like the line transfer, the line deletion processing is realized so that the continuous lines are deleted as a batch by using the line deletion buffer 23.

Concretely, the line deletion buffer stores only the upper left and the lower right coordinates as shown in FIG. 47. In case the process does not advance to the line deletion at the step b9, it is necessary to eject the content from the line deletion buffer 22. This ejecting process is carried out at the steps b6 and b10.

For checking the next line (corresponding to the previous line viewed from the flow of the description), the previous line of the latest checked line is read from the before-edition text layout information storing unit 16 and is input to L. At a step b13, it is determined whether or not the first line to be processed has been processed.

Concretely, since the previous line is input to L and the start line is the line 374 (see FIG. 37A), the just processed line is compared with the line 374. If the compared result indicates that all the lines have not been terminated, the process goes to the process at the step b3. At the step b14, the stored data is ejected from the line transfer buffer 22 and the line deletion buffer 23.

Last, at a step b15, the after-edition text layout information stored in the after-edition text layout information storing unit 15 is checked so as to display the non-displayed lines and characters.

With respect to whether or not the line or character is displayed, the after-edition text layout information contains a "displayed" mark given on a line if the line is transferred on a line basis and on a character if it is transferred on a character basis.

Figure 38B:
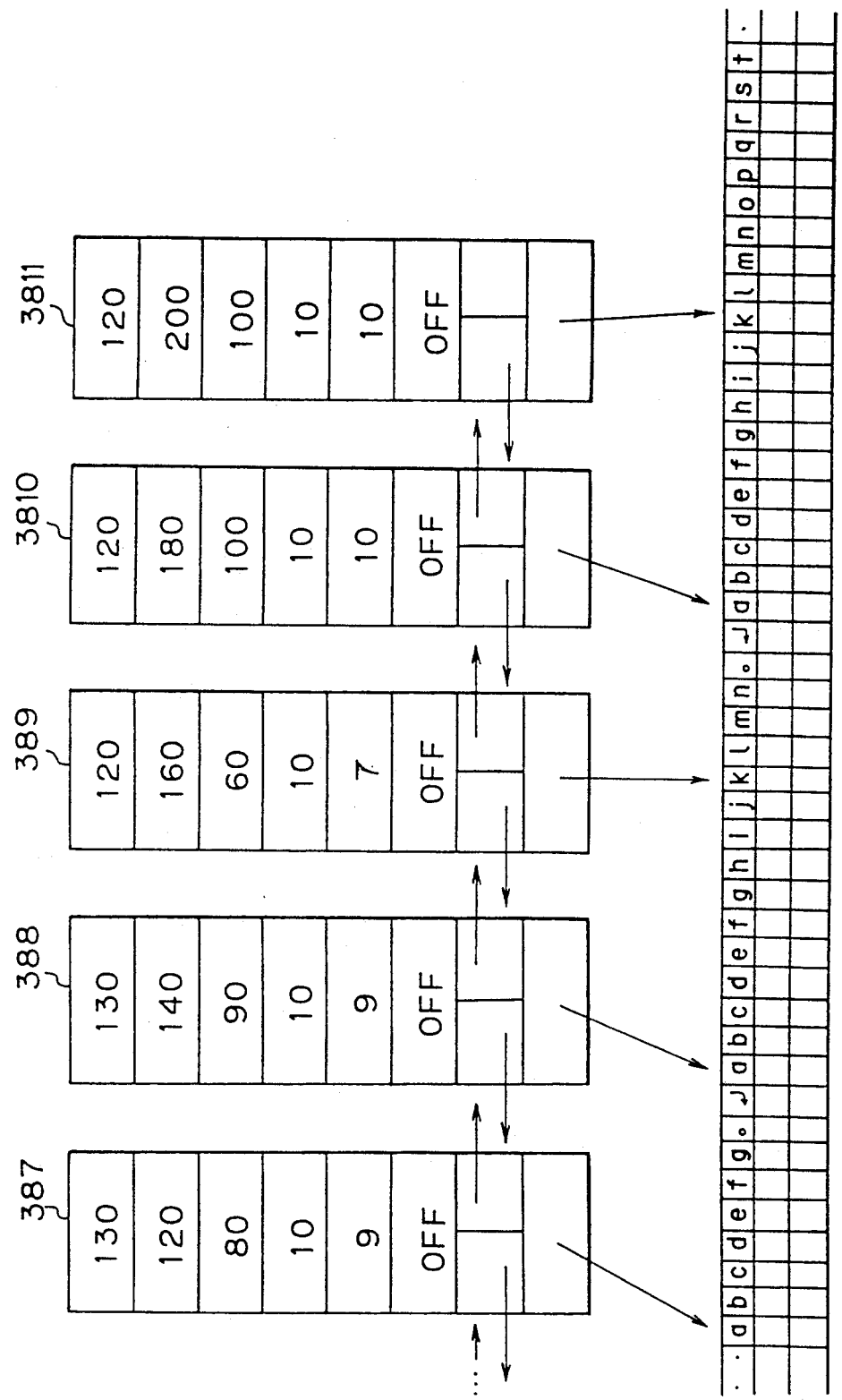

Hence, as referring to FIG. 38 which is consisting of FIGS. 38A and 38B, checking the processing flag in sequence from the head of the line information (381 to 3811) and the character string (3812) in the after-edition text layout, the line with no "displayed" mark and the character with no "displayed" mark are determined to be displayed.

Figure 27:
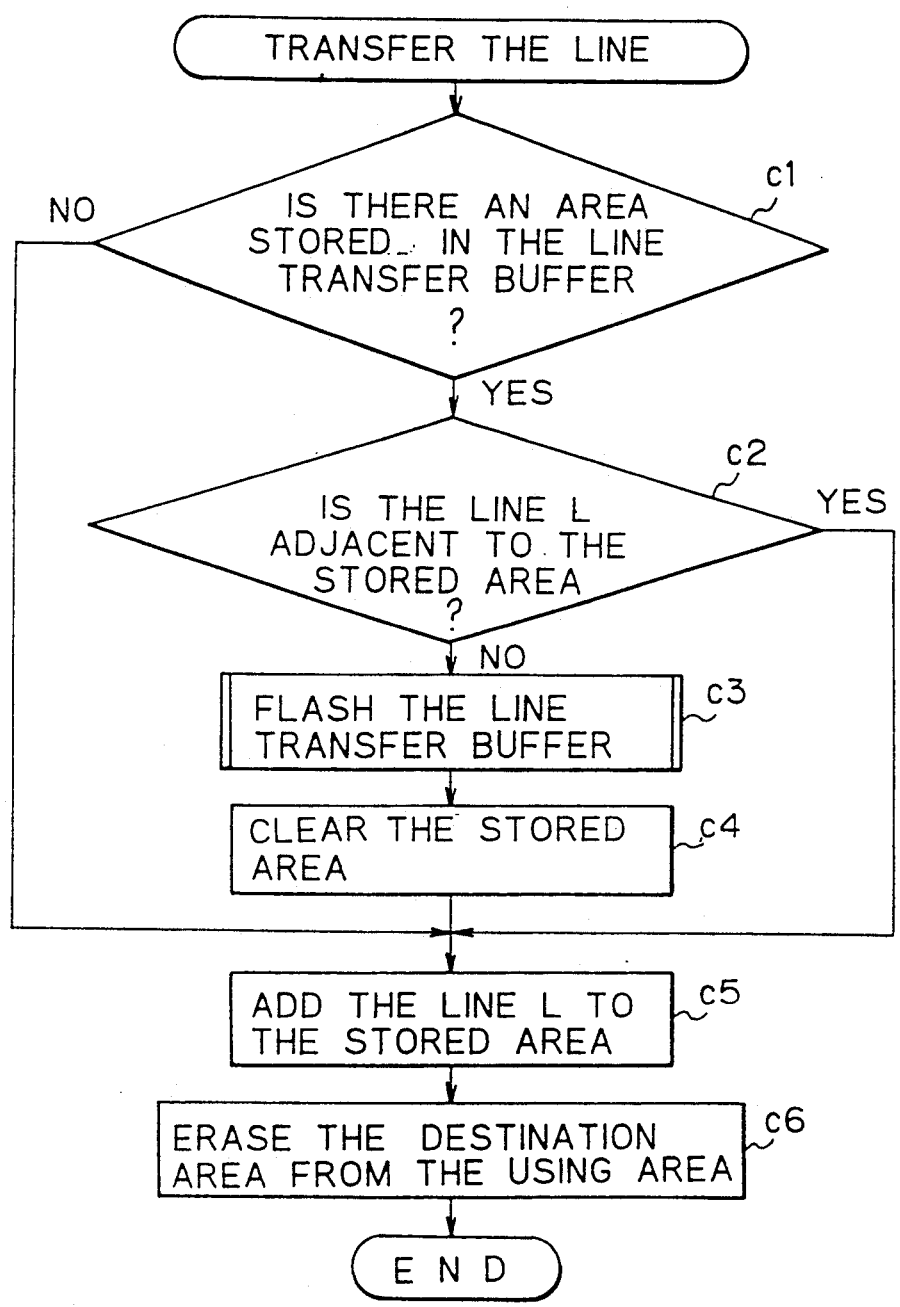

FIG. 27 shows the line transfer process of the line transfer buffer 21. In a case that a plurality of lines are transferred at a time, it results in reducing the load applied to a drawing routine and increasing the transfer speed. Hence, it is necessary to save more lines in the buffer 21.

At first, at a step c1, it is checked whether or not the stored area exists in the line transfer buffer. If yes, at a step c2, it is checked whether or not the line L being processed is adjacent to the stored area.

In a case that the following conditions are all satisfied, it is determined that the line L is adjacent to the stored area.

(1) The X-coordinate at the start location of the line L is equal to the X-coordinate at the left end (top end if the text is written vertically) of the stored area of the line transfer buffer 22. The X-coordinate denotes a co-ordinate indicating the character-aligning direction. That is, it denotes a horizontal coordinate for horizontal writing and a vertical coordinate for vertical writing.

(2) The end location of the line L is equal to the X-coordinate of the right end (lower end if the text is written vertically) of the stored area of the line transfer buffer 22.

(3) The line feeding or line spacing between the line L and the stored area of the line transfer buffer 22 is kept unchanged before the edition and after the edition.

If the line L is not adjacent to the area of the line transfer buffer 22, at a step c3, the stored area is temporarily transferred from the line transfer buffer 22. Then, at a step c4, the line transfer buffer 22 is cleared.

At a step c5, the line is added to the line transfer buffer 22. At a step c6, the original line is erased from the line information managed by the using area managing unit 21 and the "displayed" mark is given to the after-edition text layout information.

Figure 48:
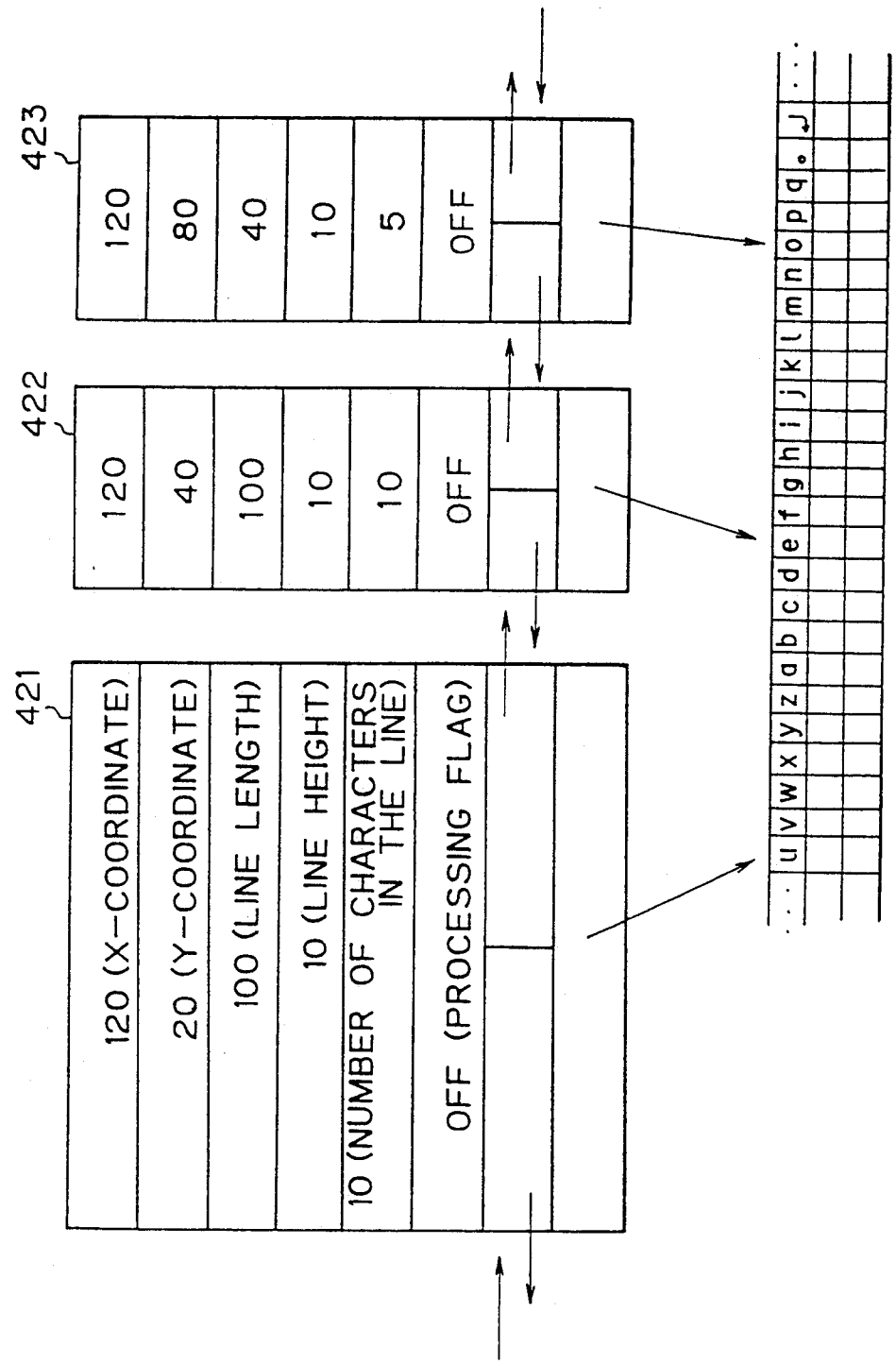
Figure 49:
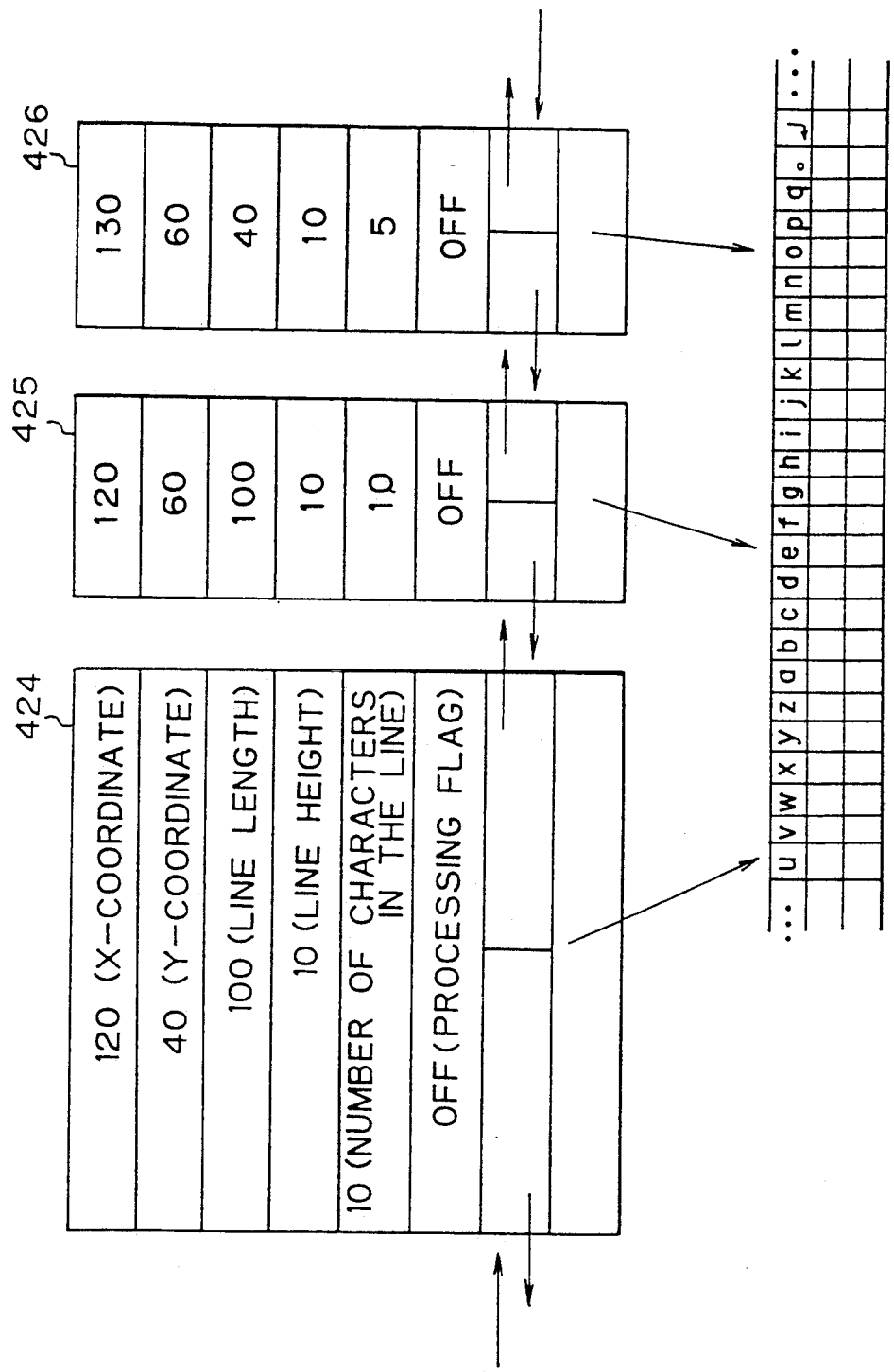

Concretely, FIG. 48 shows the before-edition text layout information of the character string 356, 357 shown in FIG. 22. FIG. 49 shows the after-edition text layout information of the character string 356, 357 shown in FIG. 22.

Herein, 421 and 422 correspond to the line 357 before edition, 423 corresponds to the line 356 before edition, 424 and 425 correspond to the line 356 after edition, and 426 corresponds to the line 356 after edition. When the lower line indicated by 357 is input to the line transfer buffer 22, the content of the buffer 22 is changed as shown in FIG. 50.

Then, the information (421 in FIG. 48) about the upper line indicated by 357 is input to L. Since the information satisfies the above conditions, the line L is added to the storage area of the buffer 22 at the step c5 and the original line is erased from the line information managed by the using area managing unit 21 at the step c6. As a result, the content of the buffer 22 is changed as shown in FIG. 51.

Figure 28:
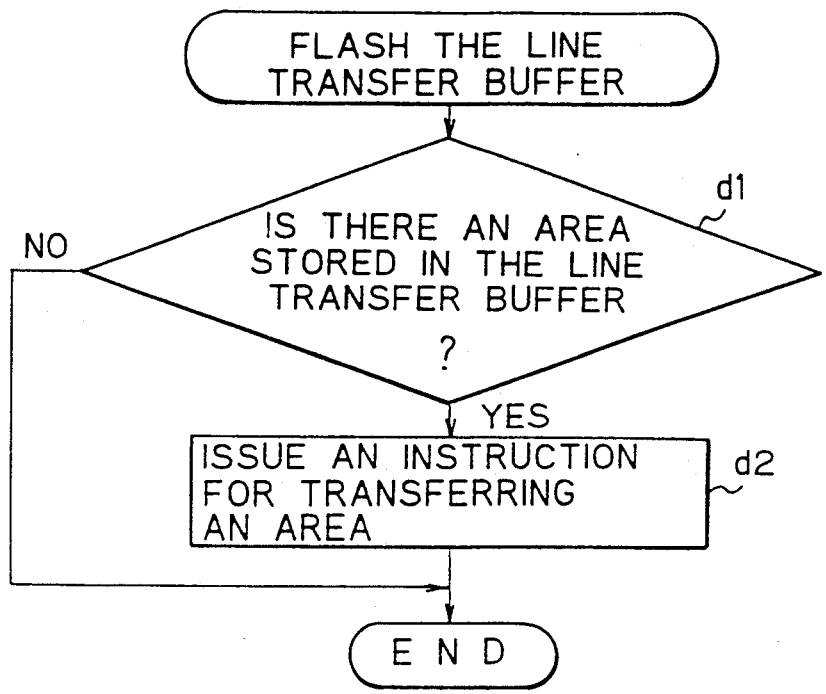

FIG. 28 shows a routine for ejecting the stored content from the line transfer buffer 22. At a step d1, it is checked whether or not the line transfer buffer 22 stores data. If yes, at a step d2, an instruction for transferring the area stored in the buffer 22 is sent to the drawing routine.

Figure 29:
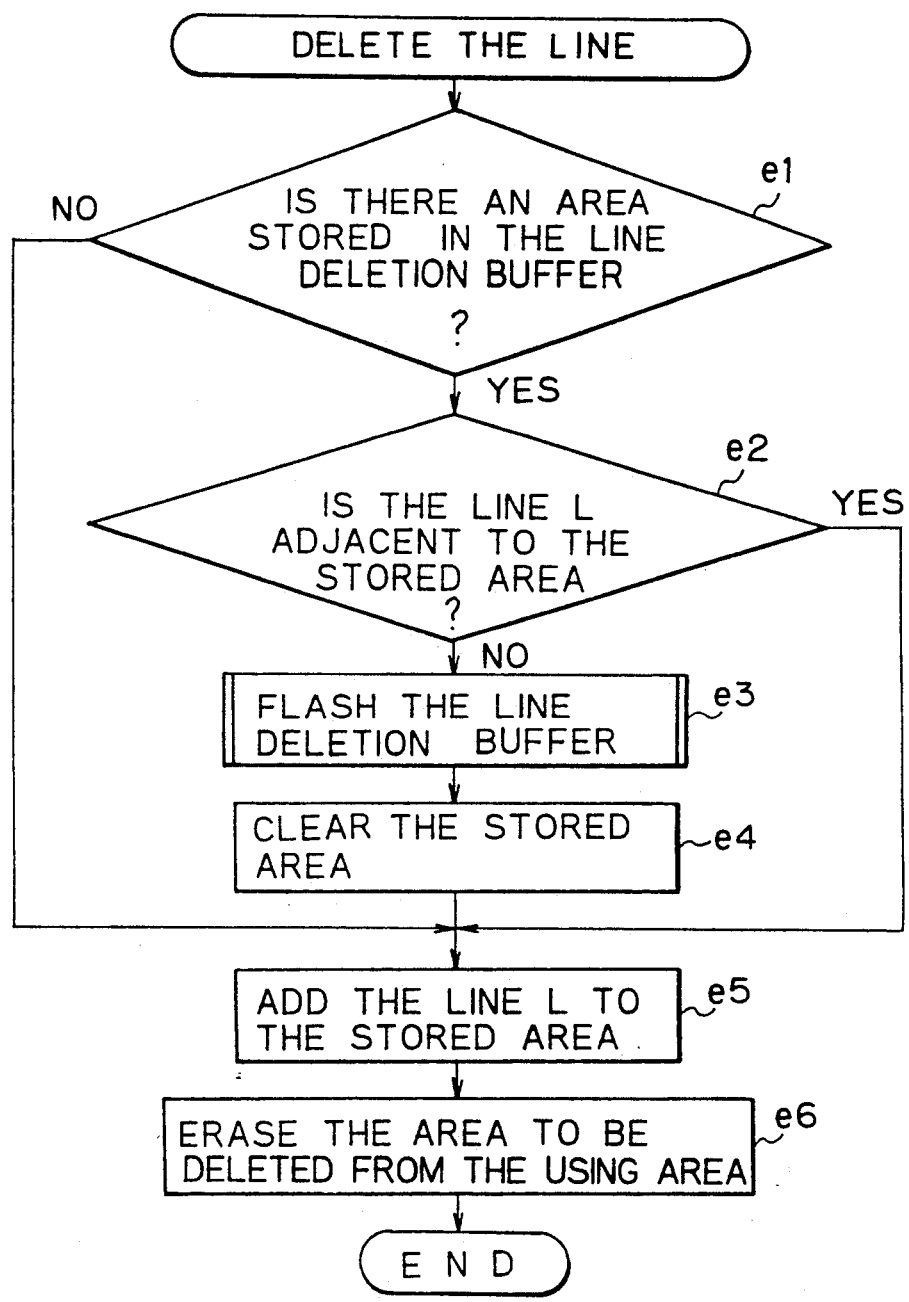

FIG. 29 shows the line deletion process of the line deletion buffer 23. The line deletion process is the substantially same as the line transfer process. In a case that a plurality of lines are deleted at a time, it results in reducing the load applied to the display image managing unit 17 and increasing a deleting speed.

At first, at a step e1, it is checked whether or not there exists a stored area. If yes, at a step e2, it is determined whether or not the line L being processed is adjacent to the stored area.

In a case that the above determining conditions (1) and (2) for the line transfer process are satisfied, it is determined that the line L is adjacent to the stored area.

If it is not adjacent to the stored area, at a step e3, the stored area is temporarily deleted. At a step e4, the line deletion buffer 23 is cleared.

Lastly, at a step e5, the line L is added to the line deletion buffer 13 and at a step e6, the deleted line is erased from the information about lines managed by the using area managing unit 21.

Figure 30:
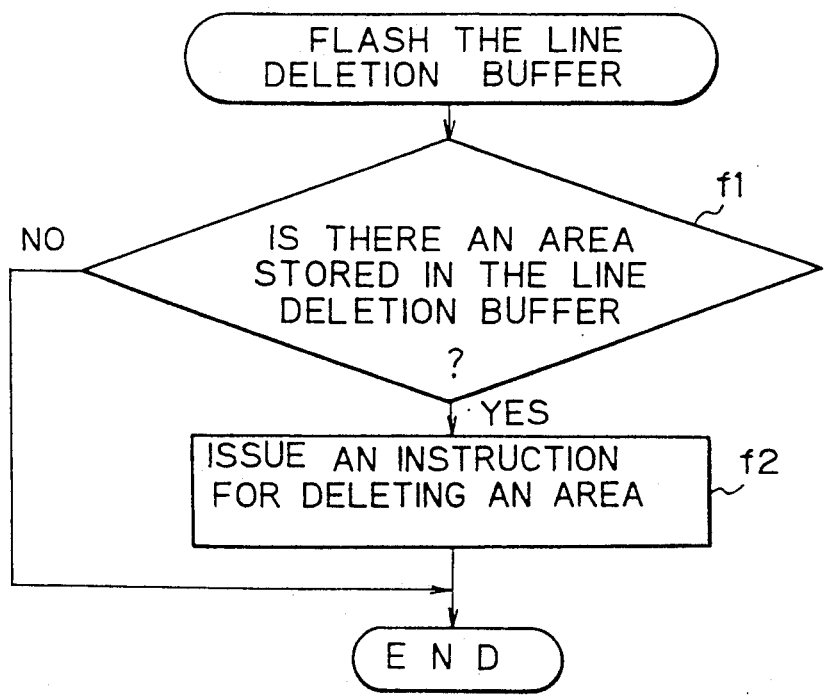

FIG. 30 shows a routine for ejecting the content from the line deletion buffer 23. At a step f1, it is checked whether or not the line deletion buffer 23 stores the data. At a step f2, an instruction for deleting the area stored in the line deletion buffer 23 (instruction having the upper left and the lower right coordinates as parameters) is sent to the display image managing unit 17.

The display image managing unit 17 serves to clear the area of the display image storing unit 18 corresponding to the specified area. An operator can see the cleared result on the display 20 through the effect of the display control unit 19.

FIG. 31, which is consisting of FIGS. 31A and 31B, shows a first half of the routine for transferring a character string on a character basis. In the first half part, it is possible to transfer the characters from the farther location from the document head to the nearer location to the document head and delete the characters disallowed to be transferred.

At the steps h1 to h13, it is checked whether or not the characters moved as a result of edition are allowed to be transferred in sequence from the line head to the line end.

At a step h1, the head character of the line L including a character code, a character attribute (character feeding, a character width, a character height, a character transformation, and so forth), and a processing flag are read from the character string information (3711) and is input to C.

Figure 43:
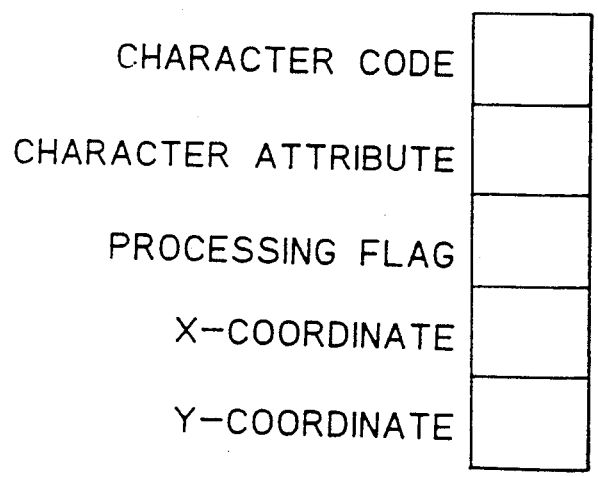

The character coordinate can be obtained by adding a line coordinate and a character feeding input as a character attribute from the line head to C (see FIG. 43).

At a step h2, it is checked whether or not all the characters contained in the line L are checked. If not, the process goes around the loop consisting of the step h2 to h13. At first, at a step h3, it is checked whether or not the character is allowed to be transferred. The untransferable character is a character reduced from a full size to a half size or enlarged from a half size to a full size through the effect of a forbidding processing or a hyphen to be eliminated after edition. All the characters except such characters are allowed to be transferred.

The untransferable characters are checked at a step h4 so that the process about those characters is branched, because they do not require the processing at the steps h5 to h10. At the step h5, it is checked whether or not a character exists at the after-edition location corresponding to the character C in the display image storing unit 18 with reference to the data managed by the using area managing unit 11 (the after-edition character corresponding to the character C is C').

Concretely, checking the head lines 391, 392, and 393 shown in FIG. 40 in sequence (assuming the line being checked as 1), if the information about all the lines satisfies the following formulas, it is determined that no character exists at the location corresponding to the line L' on the display image storing unit 18.

---

((X-coordinate of C')+(Line length of C')<(X-coordinate of 1) or (X-coordinate of C')>(Y-coordinate of 1)−(line height of 1))

and ((Y-coordinate of C')−(Line height of C')<(Y-coordinate of 1) or (Y-coordinate of C')>(Y-coordinate of 1)−(line height of 1))

---

That is, the character "a" 351 shown in FIG. 22 has the after-edition information such that the X-coordinate is 130, the Y-coordinate is 100, a character width is 10, and a character height is 10. Hence, it is understood that the after-edition character is not overlapped with the area managed by the using area managing unit 21.

If no character exists at the location, at a step h7, the character is allowed to be transferred. If not, the character is transferred from the nearer location to the farther location from the document head. The character is marked with an "unprocessed" mark at a step h9 so that the character is allowed to be processed in the last half part of the routine for the character-basis processing. At a step h10, the line L is marked with an "unprocessed" mark. The "unprocessed" mark for the character is placed in the processing flag 3711 and the "unprocessed" mark for the line is placed in the processing flag contained in the line information corresponding to L.

If the character C is not allowed to be transferred at the step h3, at a step h12, the character C is deleted. Further, like the line transfer processing and the line deletion processing, the continuous characters are transferred or deleted as a batch by using the character transfer buffer 24 and the character deletion buffer 25. If, hence, the character transfer buffer 24 and the character deletion buffer 25 do not have a wide area enough to store the continuous characters, it is necessary to eject the data stored in the buffers 24 and 25. This ejecting processing is carried out at the steps h6, h8, and h11.

The character transfer buffer 24 stores the upper left point and the lower right point of the area before and after the edition as shown in FIG. 52.

The character deletion buffer 25 stores the upper left point and the lower right point of the area before and after the edition as shown in FIG. 45. For example, in a case that only a character "a" of a character string 351 of FIG. 36 is stored in the character transfer buffer 24, it results in matching the content of the character transfer buffer 24 to the content shown in FIG. 46.

For checking the next line at a step h13, the next character of the latest checked character is read from the before-edition text layout information storing unit 16 and is input to C. Then, the process returns to the step h2 at which it is determined whether or not all the characters contained in the line L are processed. This determination is carried out by comparing the number of characters contained in the line L with the h2-passing times.

When all the characters have been processed, at a step h14, the data stored in the character transfer buffer 24 and the character deletion buffer 25 are ejected if any.

Lastly, at a step h15, in a case that the length of the character string actually input to the line L is shorter than the column width, the column width registered as a line length in the using area managing unit 21 is modified as a length of a character string.

Concretely, the line 358 shown in FIG. 22 is processed at the step h15. In the processing, at first, by comparing the line coordinate shown in FIG. 40 with the line 358, it is determined that the line 399 matches to the line 358. Then, the line length of 399 is changed to the line length of the line L (50 in this case).

Figure 34:
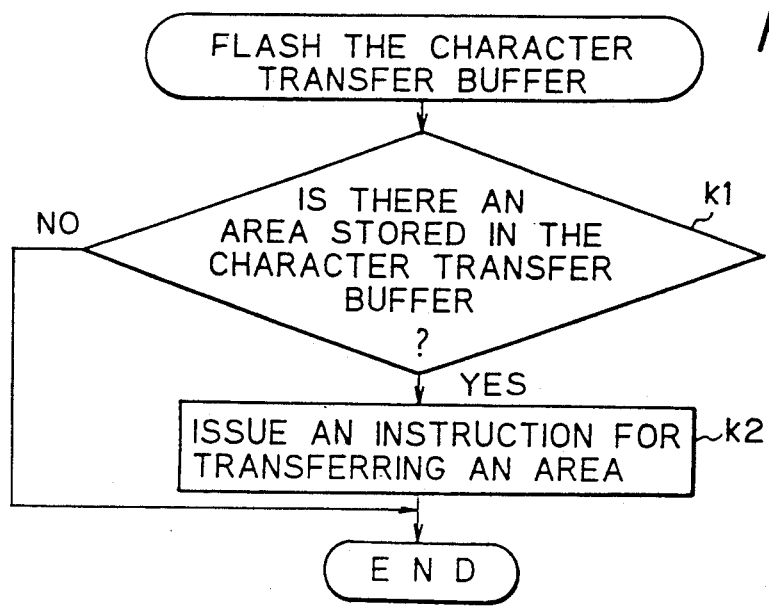

FIG. 34 shows a last half part of the routine for transferring the character string on a character basis. In this last half part, it is possible to transfer the characters contained in the line L being currently processed from the nearer location to the document head to the farther location and delete the untransferable characters. The untransferable characters are such that two or more characters are replaced with the others. In this case, all the characters are not allowed to be transferred as a batch. Hence, some of the characters are deleted and then displayed for realizing the redisplaying of those characters.

Figure 32B:
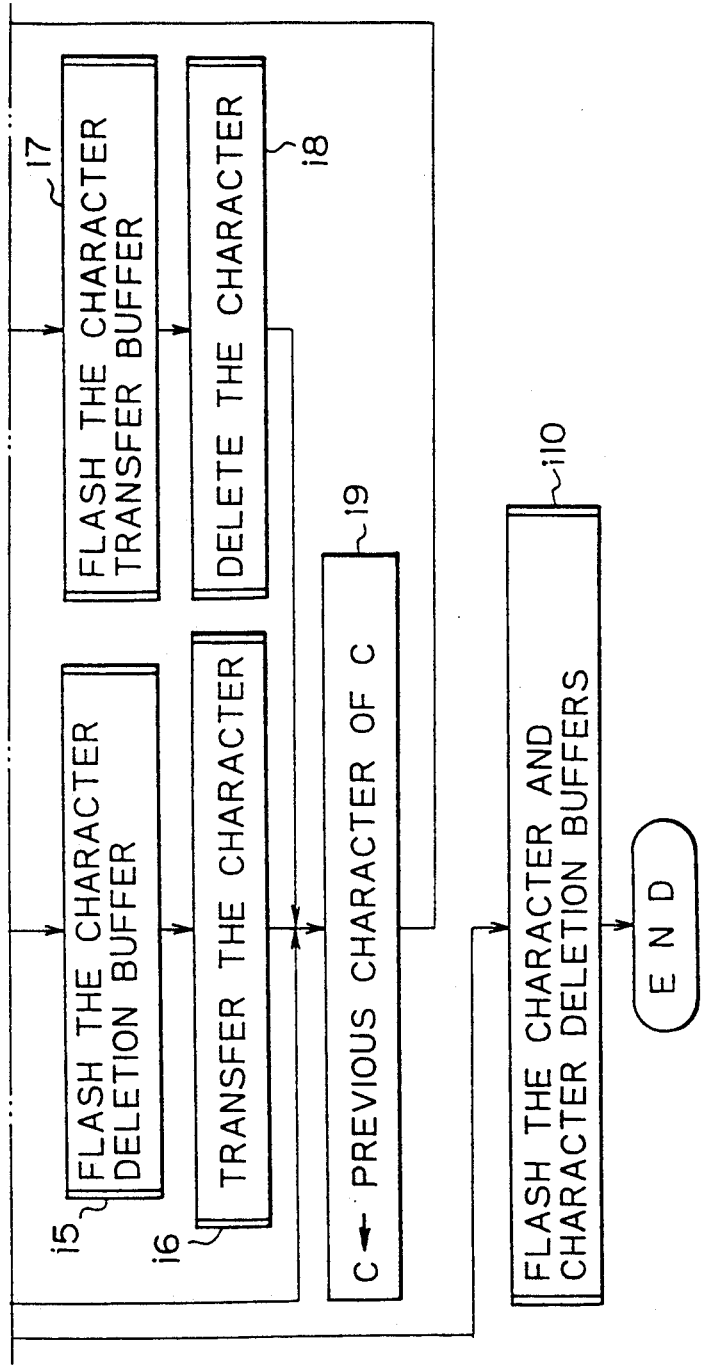

FIG. 32, which is consisting of FIGS. 32A and 32B, reversely shows a process of to the first half part, at steps i1 to i9, it is checked from the end character to the head character of the line L about whether or not the character moved as a result of the edition is allowed to be transferred. At first, at the step i1, the end character of the line L is read from the before-edition text layout information storing unit 16 to C. At the step i2, it is checked whether or not all the characters of the line L are checked. If not, the process goes around the loop consisting of the steps i2 to i9.

At the step i3, it is checked whether or not the character C is marked with a "unprocessed" mark. Only the marked character is processed at the steps i4 to i8. Then, at the step i4, like the step h5, it is checked whether or not the edited location of the character C is overlapped with the character on the display image storing unit 18 in the using area managing unit 21 (The edited character corresponding to C is C').

Concretely, checking the head lines 391, 392, and 393 shown in FIG. 40 in sequence (assuming the line being checked as 1), if the information about all the lines satisfies the following formulas, it is determined that no character exists at the location corresponding to the line L' on the display image storing unit 18.

---

((X-coordinate of C')+(Line length of C')<(X-coordinate of 1) or (X-coordinate of C')>(Y-coordinate of 1)−(line height of 1))
and
((Y-coordinate of C')−(Line height of C')<(Y-coordinate of 1) or (Y-coordinate of C')>(Y-coordinate of 1)−(line height of 1))

---

For example, the character "g" of the line 359 shown in FIG. 22 is such that the edited X-coordinate is 190, the edited Y-coordinate is 100, the character width is 10, and the character height is 10. By checking the character with the above formulas, it is determined that the character is not overlapped with the area managed by the using area managing unit 21. (In the initial state of the using area managing unit 21, the character string exists at that location. As a result of the processing at the step h15, however, no character is overlapped with the area managed by the using area managing unit 11 at the step i4.)

If not overlapped, it is possible to carry out the character transfer processing at the step i6. If overlapped, the character is determined to be an untransferable character. At the step i8, hence, the character is deleted.

Like the steps h6, h7, h11, h12 in FIG. 31, at the steps i5, i6, i7, i8 and i9, the continuous characters are transferred or deleted as a batch through the effect of the character transfer buffer 24 and the character deletion buffer 25.

In a case that the buffers 22 and 24 have wide areas to store the characters, the data stored in the buffers 22 and 24 are ejected for storing the continuous characters.

For checking the previous character at the step i9, the previous character of the latest checked character is read from the before-edition text layout information storing unit 16 to C. Then, the process returns to the step i2 at which it is determined whether or not all the characters of the line L have been processed.

If all the characters have been processed, at a step i10, it is possible to eject the data stored in the character transfer buffer 24 and the character deletion buffer 25 if any.

Figure 33:
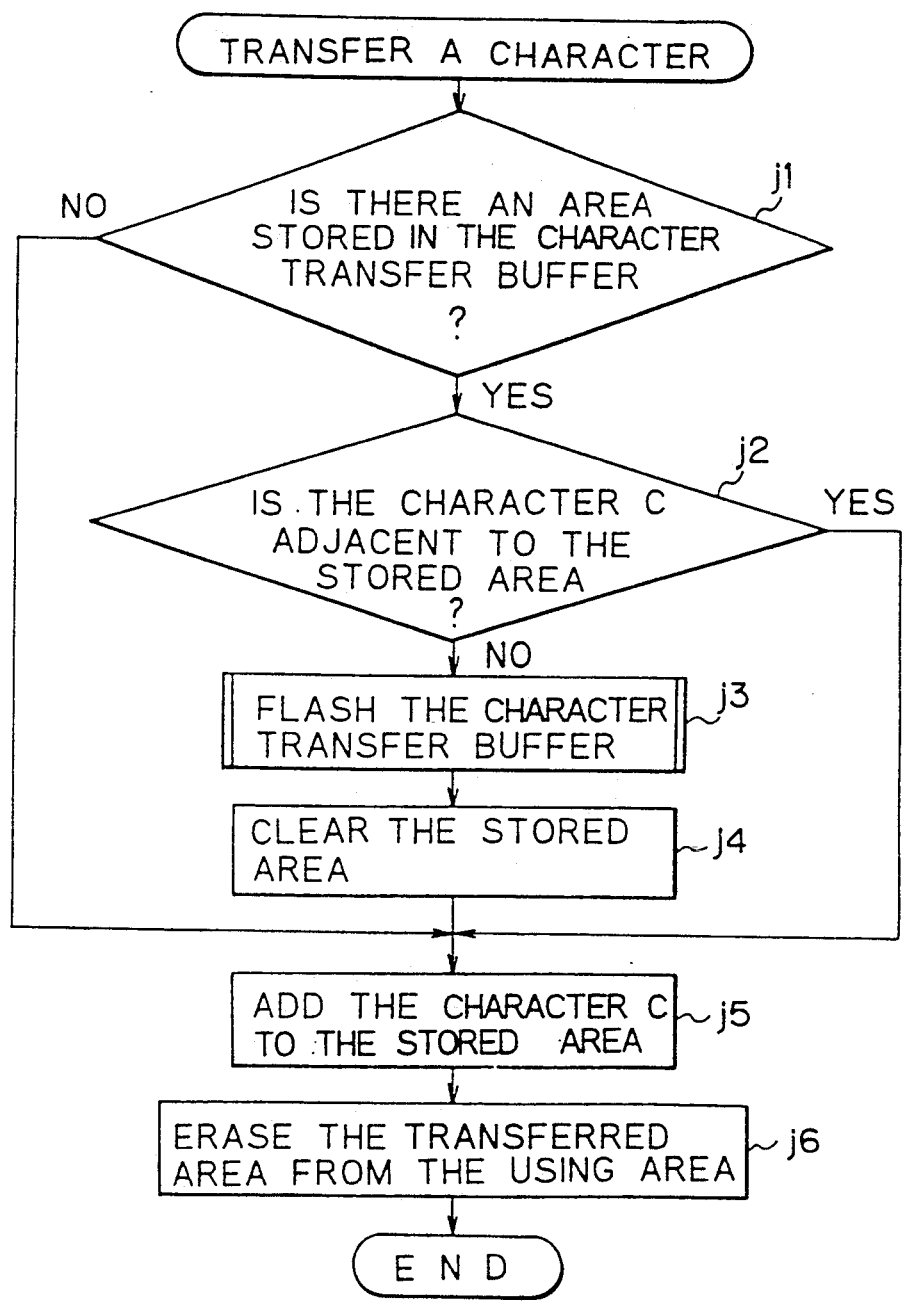

FIG. 33 shows the operation of the character transfer buffer 24 for transferring the character string on a character basis. The processing shown in FIG. 33 is substantially same as the processing shown in FIG. 27 for transferring a character string on a line basis. At first, it is checked whether or not there exists the stored area. If yes, at a step j2, it is checked whether or not the character C being processed is adjacent to the stored area. For checking, it is necessary to merely check whether or not a before-edition character feeding or character space between the character C and the stored area is equal to an after-edition character feeding or character space.

In a case that only a character "a" contained in the character string 351 is input to the character transfer buffer 24, the content of the character transfer buffer 24 matches to the content shown in FIG. 46. When the next character "b" is input to the C, at the step j2, it is determined that the character feeding has a value of 10 before edition or after edition in the light of the fact that the X-coordinate of "b" before edition is 160 and the X-coordinate of "b" after edition is 140.

If the character C is not adjacent to the stored area, at a step j3, the stored area is temporarily transferred and at a step j4, the character transfer buffer 24 is cleared.

Lastly, at a step j5, the character C is added to the character transfer buffer 24. At a step j6, the original character is erased from the information managed by the using area managing unit 21 and a "displayed" mark is added to the after-edition text layout information.

FIG. 34 shows a routine for ejecting the stored content from the character transfer buffer 24 on a character basis. At a step k1, it is checked whether or not the data stays in the character transfer buffer 24. If yes, at a step k2, an instruction for transferring an area stored in the character transfer buffer 24 is sent to the display image managing unit 17.

Figure 35:
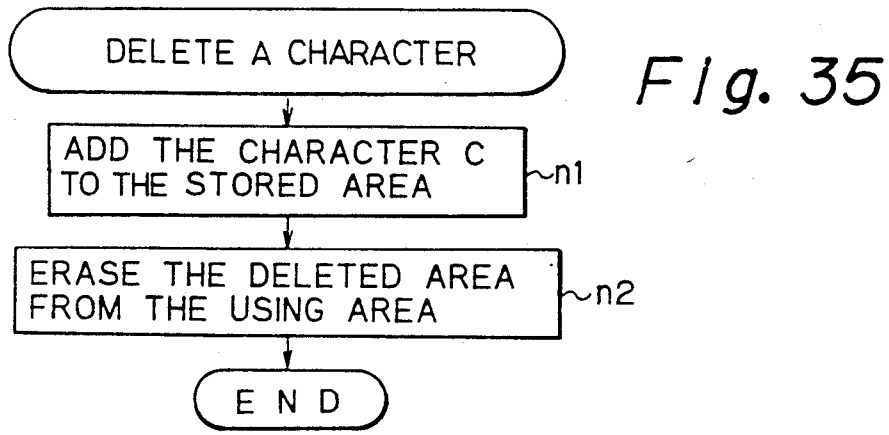

FIG. 35 shows the operation of the character deletion buffer. At a step n1, the character C is added to the character deletion buffer 25. At a step n2, the deleted character is erased from the information managed by the using area managing unit 21.

FIG. 36 shows a routine for ejecting the stored data from the character deletion buffer. At a step m1, it is checked whether or not the character deletion buffer 25 stores the data. If yes, at a step m2, an instruction for deleting the data area of the character deletion buffer 25 is supplied to the display image managing unit 17.

The foregoing procedure makes it possible to realize the redisplay of the character string. In a case that the transfer speed is substantially same as the deletion and display speed in an machine, by considering the following matters, it is possible to more increase a speed.

In a case that a character string is transferred, deleted, or displayed on a small unit basis, it results in increasing the number of drawing times and overhead. Hence, for the purpose of increasing the redisplaying speed, it is better to realize the redisplay of a character string with the deletion and display processes only, that is, without using the transfer process if the character string has a smaller number of characters than a predetermined number of characters.

Further, for the purpose of simplifying the process and saving a storage area, it is possible to eliminate a step of transferring a character string on a character basis so as to realize the redisplay of a character string only with the deletion and display unless the character string is processed on a line basis.

In a case that an machine is capable of storing a before-edition display image and an after-edition display image in respective storage areas, it is unnecessary to provide a step of determining whether or not a character stays at the location to which the character is transferred and hence to delete characters and manage the using area about the display image storing unit 18. In this case, the redisplay of the character string is made possible by simply transferring the character string in sequence from the head to the tail.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for editing documents input from an input device, the apparatus being adapted to reduce a process time of refreshing said documents to be displayed on a display device and adapted to increase a displaying speed of said refreshed documents during an editing process, said apparatus comprising:

a document storing means for storing document data;

a layout information storing means for storing layout information separately in accordance with a preceding time and a succeeding time with respect to an editing operation, said layout information indicating positions of said document data on said display device at a time when said document data are displaying;

a display image storing means for storing image data, said image data being used for displaying said document data stored in said document storing means on said display device in accordance with said layout information in said preceding time stored in said layout information storing means;

an editing means for producing said layout information in said succeeding time by utilizing both said layout information in said preceding time stored in said layout information storing means and said document data stored in said document storing means in accordance with an indication input from said input device; and a processing means for updating said image data stored in said display image storing means in accordance with a process of displaying characters and a process of transmitting said image data to said display device, said processing means being further adapted to divide said layout information to be redisplayed into a plurality of parts, said plurality of parts including a part to be deleted, a part to be newly displayed, a part to be moved on image, a part to be redisplayed, and a part to be left intact, said processing means being further adapted to register said layout information in said part to be redisplayed, into said part to be deleted and said part to be newly displayed, respectively, and further adapted to group said layout information in said part to be deleted as blocks and to delete said layout information in said part to be deleted from an area of said image data so that spatially separated areas of said document image are grouped together and then the group is deleted from said text.

2. An apparatus according to claim 1, wherein said editing means further includes a storage means therein, and said editing means is adapted to store said layout information in said succeeding time into said storage means thereof and further adapted to update said document data stored in said document storing means.

3. An apparatus according to claim 1, wherein said processing means is further adapted to compare said layout information in said preceding time with said layout information in said succeeding time stored in said layout information storing means so as to differentiate said layout information in said succeeding time from said layout information in said preceding time.

4. An apparatus according to claim 1, wherein said layout information storing means includes a pointer for separating said layout information in said preceding time and said layout information in said succeeding time.

5. An apparatus according to claim 1, wherein said editing means is further adapted to replace said layout information in said preceding time with said layout information in said succeeding time after a completion of refreshing process of said image data stored in said image storing means.

6. An apparatus according to claim 1, wherein said layout information storing means includes a storing device for storing said layout information in said preceding time and another storing device for storing said layout information in said succeeding time.

7. An apparatus according to claim 1, wherein said processing means is further adapted to determine a sequence of an area in said part to be moved on image.

8. An apparatus according to claim 7, wherein said processing means is further adapted to group said moving area as blocks so that spatially separated areas of said document image are grouped together and then the group is deleted from the image.

9. An apparatus according to claim 8, wherein said processing means is further adapted to move each of said blocks in accordance with a determining sequence.

10. An apparatus according to claim 9, wherein said processing means is further adapted to display said layout information in said part to be newly displayed.

11. An apparatus according to claim 1, wherein said layout information includes a text line location, a text line height, a text line length, a processing flag for indicating a text line or a character to be displayed or to be moved.

12. An apparatus according to claim 1, wherein said layout information further includes character string information having a character code, a type style, and a size of said type style.

13. An apparatus according to claim 1, wherein said apparatus further comprises a managing means for registering said layout information to be redisplayed from said layout information in said preceding time.

14. An apparatus according to claim 13, wherein said apparatus further comprises a transfer buffer for temporarily storing line data of said layout information to be transferred.

15. An apparatus according to claim 14, wherein said apparatus further comprises a deletion buffer for temporarily storing line data of said layout information to be deleted.

16. An apparatus according to claim 15, wherein said apparatus further comprises a character transfer buffer for temporarily storing character data of said layout information to be transferred.

17. An apparatus according to claim 16, wherein said apparatus further comprises a character deletion buffer for temporarily storing character data of said layout information to be deleted.

18. An apparatus according to claim 17, wherein said apparatus further comprises a display image control device for controlling a display image.

19. An apparatus according to claim 18, wherein said apparatus further comprises a display control device for controlling said displaying device so that said display image controlled in accordance with said display image control device is displayed on said display device.

* * * * *